United States Patent
Garahan

(10) Patent No.: US 8,066,148 B2
(45) Date of Patent: Nov. 29, 2011

(54) PORTABLE HOLDER FOR BEVERAGE CONTAINERS

(76) Inventor: Patrick J. Garahan, Coronado, CA (US)

( * ) Notice: Subject to any disclaimer, the term of this patent is extended or adjusted under 35 U.S.C. 154(b) by 261 days.

(21) Appl. No.: 12/389,262

(22) Filed: Feb. 19, 2009

(65) Prior Publication Data

US 2009/0206098 A1 Aug. 20, 2009

Related U.S. Application Data

(60) Provisional application No. 61/029,861, filed on Feb. 19, 2008.

(51) Int. Cl.
*B65D 25/00* (2006.01)
*B65D 23/00* (2006.01)
(52) U.S. Cl. .................................. 220/737; 220/751
(58) Field of Classification Search .............. 220/737, 220/751; 224/926; 215/399
See application file for complete search history.

(56) References Cited

U.S. PATENT DOCUMENTS

| | | |
|---|---|---|
| 3,939,369 A | 2/1976 | Sullivan |
| 3,940,882 A | 3/1976 | Mabuchi |
| 4,191,350 A | 3/1980 | Ormond |
| 4,206,564 A | 6/1980 | Ogawa |
| 4,266,912 A | 5/1981 | Roman |
| 4,434,961 A | 3/1984 | Hoye |
| 4,523,557 A | 6/1985 | Fox |
| D289,961 S | 5/1987 | Hentrich |
| 4,673,363 A | 6/1987 | Hudson et al. |
| 5,029,793 A | 7/1991 | Warner |
| 5,115,804 A | 5/1992 | Brookman |
| 5,249,770 A | 10/1993 | Louthan |
| D361,475 S | 8/1995 | Strong |
| 5,535,713 A | 7/1996 | Braddock |
| 5,954,394 A | 9/1999 | Czyzewski |
| 6,045,017 A | 4/2000 | Connell |
| 6,091,825 A | 7/2000 | Minkofski |
| 6,151,172 A | 11/2000 | Ferraro |
| 6,161,692 A | 12/2000 | Lizarraga |
| 6,186,522 B1 | 2/2001 | Weis |
| 6,198,532 B1 | 3/2001 | Cabib et al. |
| 6,213,970 B1 | 4/2001 | Nelson et al. |

(Continued)

FOREIGN PATENT DOCUMENTS

KR 2004 0074207 A 8/2004

OTHER PUBLICATIONS

International Search Report and Written Opinion in related Application No. PCT/US2009/034571, (Jul. 14, 2010).

(Continued)

*Primary Examiner* — Harry Grosso
(74) *Attorney, Agent, or Firm* — Knobbe, Martens, Olson & Bear LLP

(57) ABSTRACT

A portable holder for beverage containers includes a basket suspended from a first movable position piece. The first movable position piece is rotatably connected to a first plate. The first plate is connected to a second plate. The second plate may be attached to a hanging member for suspending the portable holder for beverage containers. The second plate may be attached to a strap for securing the second plate to a stationary object or a moving vehicle. The portable holder for beverage containers may be configured to fold into a smaller size for storage when not in use.

20 Claims, 19 Drawing Sheets

U.S. PATENT DOCUMENTS

| | | |
|---|---|---|
| 6,264,273 B1 | 7/2001 | Waters, Sr. |
| 6,276,798 B1 | 8/2001 | Gil et al. |
| 6,293,162 B1 | 9/2001 | Mathur et al. |
| 6,307,686 B1 | 10/2001 | Ferraro |
| 6,318,689 B1 * | 11/2001 | Rodriguez .................. 248/311.2 |
| 6,412,861 B1 | 7/2002 | Herman et al. |
| 6,447,754 B1 | 9/2002 | Kligerman et al. |
| 6,466,681 B1 | 10/2002 | Siska, Jr. et al. |
| 6,467,385 B1 | 10/2002 | Buttrick et al. |
| 6,472,007 B2 | 10/2002 | Bezek et al. |
| 6,484,594 B1 | 11/2002 | Saaski et al. |
| 6,502,808 B1 | 1/2003 | Stone et al. |
| 6,532,835 B1 | 3/2003 | Saaski et al. |
| 6,556,853 B1 | 4/2003 | Cabib et al. |
| 6,578,809 B1 | 6/2003 | Dimella |
| 6,625,287 B1 | 9/2003 | Wurtz |
| 6,629,799 B2 | 10/2003 | Flores |
| 6,634,547 B2 | 10/2003 | Willis |
| 6,636,037 B1 | 10/2003 | Ou-yang |
| 6,645,048 B1 | 11/2003 | Linderholm et al. |
| 6,648,311 B2 | 11/2003 | Groomes |
| 6,655,563 B2 | 12/2003 | Shimajiri |
| 6,702,687 B1 | 3/2004 | Henry |
| 6,705,438 B2 | 3/2004 | Ananthanarayanan et al. |
| 6,717,376 B2 | 4/2004 | Lys et al. |
| 6,742,617 B2 | 6/2004 | Jeswine et al. |
| 6,776,104 B2 | 8/2004 | Herbst |
| 6,827,764 B2 | 12/2004 | Springett et al. |
| 6,860,300 B1 | 3/2005 | Kuntz |
| 6,862,790 B2 | 3/2005 | Kato |
| 6,896,013 B2 | 5/2005 | Kuntz |
| 6,918,509 B2 | 7/2005 | Baker et al. |
| 6,941,698 B2 | 9/2005 | Telles |
| 6,986,518 B1 | 1/2006 | Besaw |
| 7,040,590 B2 | 5/2006 | Carnevali |
| 7,055,908 B1 | 6/2006 | Williams |
| 7,075,084 B2 | 7/2006 | Thompson et al. |
| 7,090,183 B2 | 8/2006 | Heybl et al. |
| 7,099,467 B1 | 8/2006 | Rohrbach |
| 7,104,599 B2 | 9/2006 | Berger et al. |
| 7,114,823 B2 | 10/2006 | Mccullough et al. |
| 7,115,297 B2 | 10/2006 | Stillman |
| 7,117,827 B1 | 10/2006 | Hinderks |
| 7,119,338 B2 | 10/2006 | Thompson et al. |
| 7,121,481 B2 | 10/2006 | Berglund et al. |
| 7,126,096 B1 | 10/2006 | Matsen et al. |
| 7,127,957 B2 | 10/2006 | Mathur et al. |
| 7,128,373 B2 | 10/2006 | Kurtycz et al. |
| 7,132,084 B1 | 11/2006 | Roumpos |
| 7,134,649 B2 | 11/2006 | Boyl-davis et al. |
| 7,134,819 B2 | 11/2006 | Bullock et al. |
| 7,136,747 B2 | 11/2006 | Raney |
| 7,141,136 B2 | 11/2006 | Mcneely et al. |
| 7,150,538 B2 | 12/2006 | Vander Horst |
| 7,151,322 B2 | 12/2006 | Eskandr |
| 7,160,949 B2 | 1/2007 | Ota et al. |
| 7,164,413 B2 | 1/2007 | Davis et al. |
| 7,166,570 B2 | 1/2007 | Hunter et al. |
| 7,171,964 B2 | 2/2007 | Moore et al. |
| 7,171,990 B2 | 2/2007 | Kuntz |
| 7,174,031 B2 | 2/2007 | Rhoads et al. |
| 7,178,170 B2 | 2/2007 | Thompson |
| 7,178,357 B2 | 2/2007 | Link |
| 7,178,477 B2 | 2/2007 | Johnston |
| 7,179,173 B2 | 2/2007 | Henry et al. |
| 7,187,185 B2 | 3/2007 | Dallenbach et al. |
| 7,188,314 B2 | 3/2007 | Mizrah |
| 7,188,882 B2 | 3/2007 | Dry |
| 7,189,843 B2 | 3/2007 | Tsai et al. |
| 7,191,653 B2 | 3/2007 | Park et al. |
| 7,204,041 B1 | 4/2007 | Bailey, Sr. et al. |
| 7,204,367 B2 | 4/2007 | Bott et al. |
| 7,216,600 B1 | 5/2007 | Hamilton et al. |
| 7,216,642 B2 | 5/2007 | Poesch et al. |
| 7,219,908 B1 | 5/2007 | Howard |
| 7,226,252 B2 | 6/2007 | Glodowski |
| 7,226,692 B2 | 6/2007 | Singer et al. |
| 7,231,922 B2 | 6/2007 | Davison et al. |
| 7,234,763 B2 | 6/2007 | Gupta et al. |
| 7,242,152 B2 | 7/2007 | Dowling et al. |
| 7,243,239 B2 | 7/2007 | Kirovski et al. |
| 7,244,157 B2 | 7/2007 | Simpson |
| 7,246,639 B2 | 7/2007 | Kuntz |
| 7,251,482 B2 | 7/2007 | Ackermann-markes |
| 7,260,914 B2 | 8/2007 | O'connor |
| 7,261,008 B2 | 8/2007 | Saaski et al. |
| 7,264,189 B2 | 9/2007 | Holcomb et al. |
| 7,266,965 B2 | 9/2007 | Blackstone |
| 7,266,966 B2 | 9/2007 | Blackstone |
| 7,272,420 B2 | 9/2007 | Falcon et al. |
| 2002/0014524 A1 | 2/2002 | Willis |
| 2002/0145096 A1 | 10/2002 | Eubanks |
| 2003/0037420 A1 | 2/2003 | Kato |
| 2004/0035863 A1 | 2/2004 | Metcalf et al. |
| 2006/0097553 A1 | 5/2006 | Spurlock et al. |
| 2006/0272188 A1 | 12/2006 | Staples |
| 2007/0057844 A1 | 3/2007 | Kollgaard |

OTHER PUBLICATIONS

International Preliminary Report on Patentability in related Application No. PCT/US2009/034571, (Aug. 24, 2010).

* cited by examiner

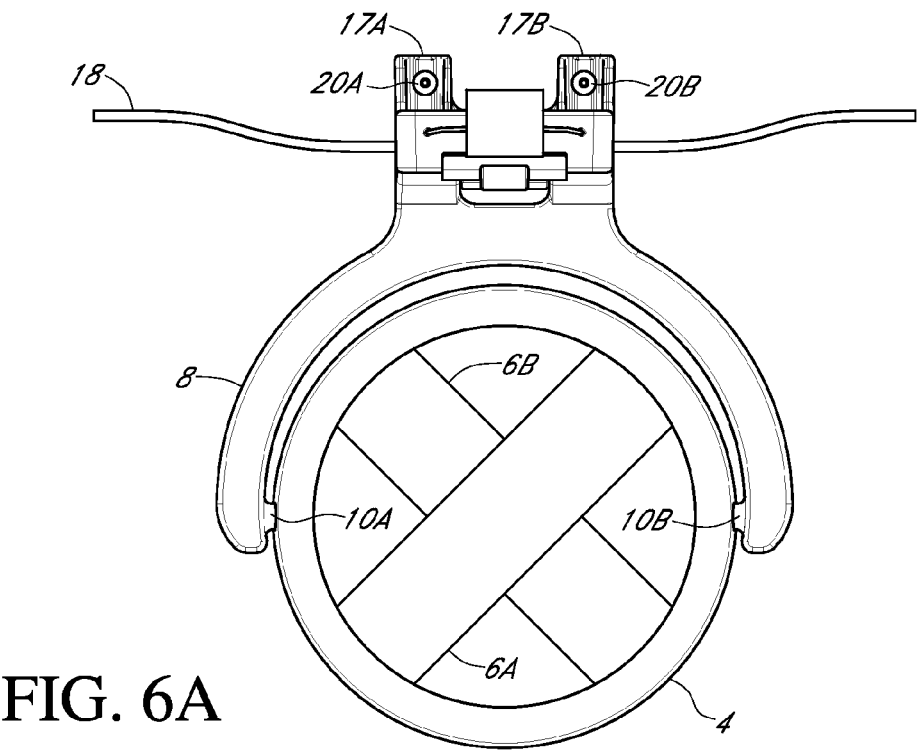
FIG. 6A
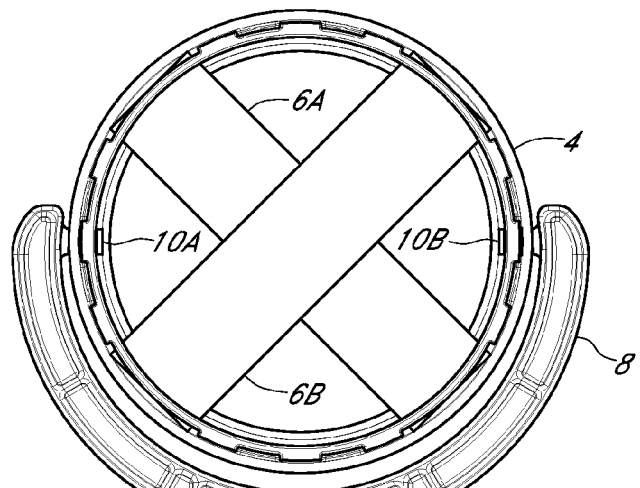
FIG. 6B
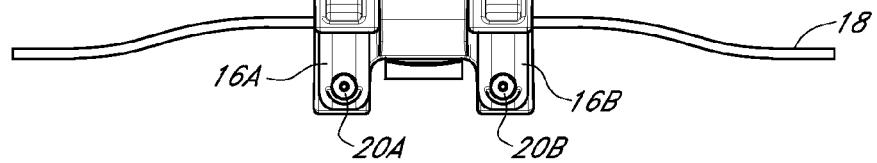

PORTABLE HOLDER FOR BEVERAGE CONTAINERS

CROSS-REFERENCE TO RELATED APPLICATIONS

This is a non-provisional application, which claims priority to U.S. Provisional Patent Application No. 61/029,861, filed on Feb. 19, 2008, which is hereby incorporated by reference in its entirety.

BACKGROUND

Various types of mechanical holders for use in connection with beverages exist in the art. For example, U.S. Pat. No. 7,090,183 to Heybl et al. discloses a gimbaled and adjustable beverage holder; U.S. Pat. No. 6,941,698 to Telles discloses an object hanger; U.S. Pat. No. 6,045,017 to Connell discloses a collapsible holder with a collapsible frame for holding a container; U.S. Pat. No. 5,249,770 to Louthan discloses a beverage container holder with a flexible strap connected to a support; U.S. Pat. No. 5,029,793 to Warner discloses a method for holding a cup in a moving vehicle; U.S. Design Pat. No. 361,475 to Strong discloses a drink holder for sporting events; and U.S. Design Pat. No. 289,961 to Hentrich illustrates a collapsible beverage container holder.

SUMMARY OF CERTAIN INVENTIVE ASPECTS

In one aspect a portable holder for a beverage container includes a first plate attached to a first movable position piece, wherein the first movable position piece may be configured to hold a beverage container placed therein and a second plate connected to the first plate.

In some embodiments the first movable position piece may include, for example, a basket suspended from the first movable position piece. In some embodiments the basket may include a mesh. In some embodiments the basket may include a first strap. In some embodiments the portable holder for a beverage container further may include a second strap connected to the second plate. In some embodiments the first movable position piece at least partially circumnavigates a beverage container placed therein. For example, the first movable position piece can include one or more arms or pieces that partially surround the beverage container. In some aspects the arms or pieces can connect, for example, to form a closed ring (circular or any other shape), while in other aspects the arms or pieces do not connect, but are able to support or secure a beverage container. In some embodiments the first movable position piece may be configured to rotate with respect to the first plate. In some embodiments the first plate can be connected to the second plate by a hinge. In some embodiments the position of the first plate relative to the second plate prevents the hinge from opening to an angle greater than, for example, about 90 degrees.

In some embodiments the holder for a beverage container further may include a second movable position piece configured to prevent the first plate and the second plate from opening to an angle greater than about 90 degrees. In some aspects a second movable position piece can be configured to prevent the hinge from opening to an angle greater than, for example, about 90 degrees when the second movable position piece may be in a first position. In some embodiments the hinge may be configured to open, for example, to about a 180 degree angle between the first plate and the second plate when the second movable position piece may be in a second position. In some embodiments a portable holder for a beverage container further may include a third movable position piece configured to prevent rotation of the first movable position piece with respect to the first plate when the third movable position piece may be in a first position. In some embodiments the third movable position piece may be configured to allow rotation of the first movable position piece with respect to the first plate when the third movable position piece may be in a second position. In some embodiments the first movable position piece may be attached to the first plate at two places.

In some embodiments a portable holder for a beverage container further may include a hanging member attached to the second plate. In some embodiments the hanging member may be configured to support the weight of the portable holder for a beverage container suspended therefrom. In some embodiments the hanging member may include, for example, a hook. In some embodiments the hanging member can include, for example, a loop.

In another aspect a portable holder for a beverage container may include a basket suspended from a first movable position piece; a first plate attached to the first movable position piece such that the first movable position piece may be configured to rotate with respect to the first plate; a second plate connected to the first plate; a second movable position piece attached to the portable holder for a beverage container, wherein the second movable position piece may be configured to prevent movement between the first plate and the second plate; and a third movable position piece rotatably attached to the first plate such that in a first position the third movable position piece prevents rotation of the first movable position piece and in a second position the third movable position piece allows rotation of the first position piece.

In another aspect a portable holder for a beverage container may include a basket suspended from a first movable position piece; a first plate attached to the first movable position piece such that the first movable position piece may be configured to rotate with respect to the first plate; a second plate connected to the first plate by a hinge; and a second movable position piece attached to the portable holder for a beverage container, wherein in a first position the second movable position piece may be configured to prevent the hinge between the first plate and the second plate from opening greater than, for example, about 90 degrees and wherein in a second position the second movable position piece may be configured to allow the hinge between the first plate and the second plate to open to, for example, about 180 degrees.

In another aspect a portable holder for a beverage container may include a basket configured to hold a beverage container placed therein; a first plate attached to the basket; a second plate attached the first plate by a hinge; a flexible strap connected the second plate, wherein the flexible strap may be configured to attach the second plate to an arm rest of a chair.

In another aspect a portable holder for a beverage container may include a basket configured to hold a beverage container; a first plate attached to the basket, wherein the basket may be configured to rotate with respect to the first plate; a second plate attached to the first plate by a hinge; a movable position piece configured to allow the hinge to open to a first position; and a hanging member attached to the second plate, wherein the portable container may be configured to be suspended from the hanging member. In some embodiments the hanging member may be a hook. In some embodiments the hanging member may be a loop.

In another aspect a method of holding a beverage container may include placing a beverage container in a device of the present disclosure.

In another aspect a method of making a beverage container holder may include attaching a first plate to a first movable position piece, wherein the first movable position piece may be configured to hold a beverage container placed therein; and attaching a second plate the first plate.

In some embodiments the method of making a beverage container holder further may include attaching a hanging member to the second plate. In some embodiments the hanging member may be configured to support the weight of the portable holder for a beverage container suspended therefrom. In some embodiments the hanging member may include, for example, a hook. In some embodiments the hanging member may include, for example, a loop. In some embodiments the method of making a beverage container holder further may include connecting a strap to the second plate. In some embodiments the first movable position piece may include, for example, a basket suspended from the first movable position piece. In some embodiments the basket can include, for example, a mesh. In some embodiments the basket can include, for example, a first strap. In some embodiments the first movable position piece at least partially circumnavigates a beverage container placed therein. For example, the first movable position piece can include one or more arms or pieces that partially surround the beverage container. In some aspects the arms or pieces can connect, for example, to form a closed ring (circular or any other shape), while in other aspects the arms or pieces do not connect, but are able to support or secure a beverage container.

In some embodiments the first movable position piece may be configured to rotate with respect to the first plate. In some embodiments attaching the first plate to the second plate may include, for example, a hinge. In some embodiments the method of making a beverage container holder further can include placing a second movable position piece may be in a first position between the first plate and the second plate to prevent the hinge from opening to an angle greater than, for example, about 90 degrees. In some embodiments the method of making a beverage container holder further can include moving the second movable position piece to a second position so the hinge opens to, for example, about a 180 degree angle between the first plate and the second plate. In some embodiments the method of making a beverage container holder further can include placing a third movable position piece in a first position to prevent rotation of the first movable position piece with respect to the first plate. In some embodiments the method of making a beverage container holder further may include moving the third movable position piece to a second position to allow rotation of the first movable position piece with respect to the first plate. In some embodiments the first movable position piece may be attached to the first plate at two places.

In some embodiments the portable holder for a beverage container may be configured to fold into a volume less than 1×3×3 in$^3$. In some embodiments the portable holder for a beverage container can be configured to weigh less than 10 oz., less than 6 oz., less than 5 oz., less than 4 oz., less than 3 oz. or less than 2 oz., for example.

Some aspects relate to methods of holding or supporting beverage container holders using a device described herein. For example, beverage container holders may be placed in vehicles or on stationary objects and then have beverage containers placed in them. Vehicles may include, for example, airplanes, cars, bicycles, motorcycles, moving chairs for the disabled or aged and/or watercraft. Stationary objects may include, for example, bags, briefcases, luggage, cupboards, chairs, countertops and/or door frames.

Some aspects relate to methods of making a device described herein. More specifically, one of ordinary skill in the art, informed by the present disclosure, will be enabled to make, fabricate, assemble and/or construct any of the aspects or embodiments of a beverage container holder device discussed herein.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the methods and/or devices and/or other subject matter described herein will become apparent in the teachings set forth herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and, therefore, are not to be considered limiting of its scope; the disclosure will be described with additional specificity and detail through use of the accompanying drawings. An apparatus according to some of the described embodiments can have several aspects, no single one of which necessarily is solely responsible for the desirable attributes of the apparatus. After considering this discussion, and particularly after reading the section entitled "Detailed Description of the Preferred Embodiment" one will understand how the features of this invention provide advantages that include the ability to hold a beverage container.

FIG. 6A is a top view of a portable holder for a beverage container.

FIG. 6B is a bottom view of the portable holder for a beverage container illustrated in FIG. 6A.

DETAILED DESCRIPTION

Figure 1:
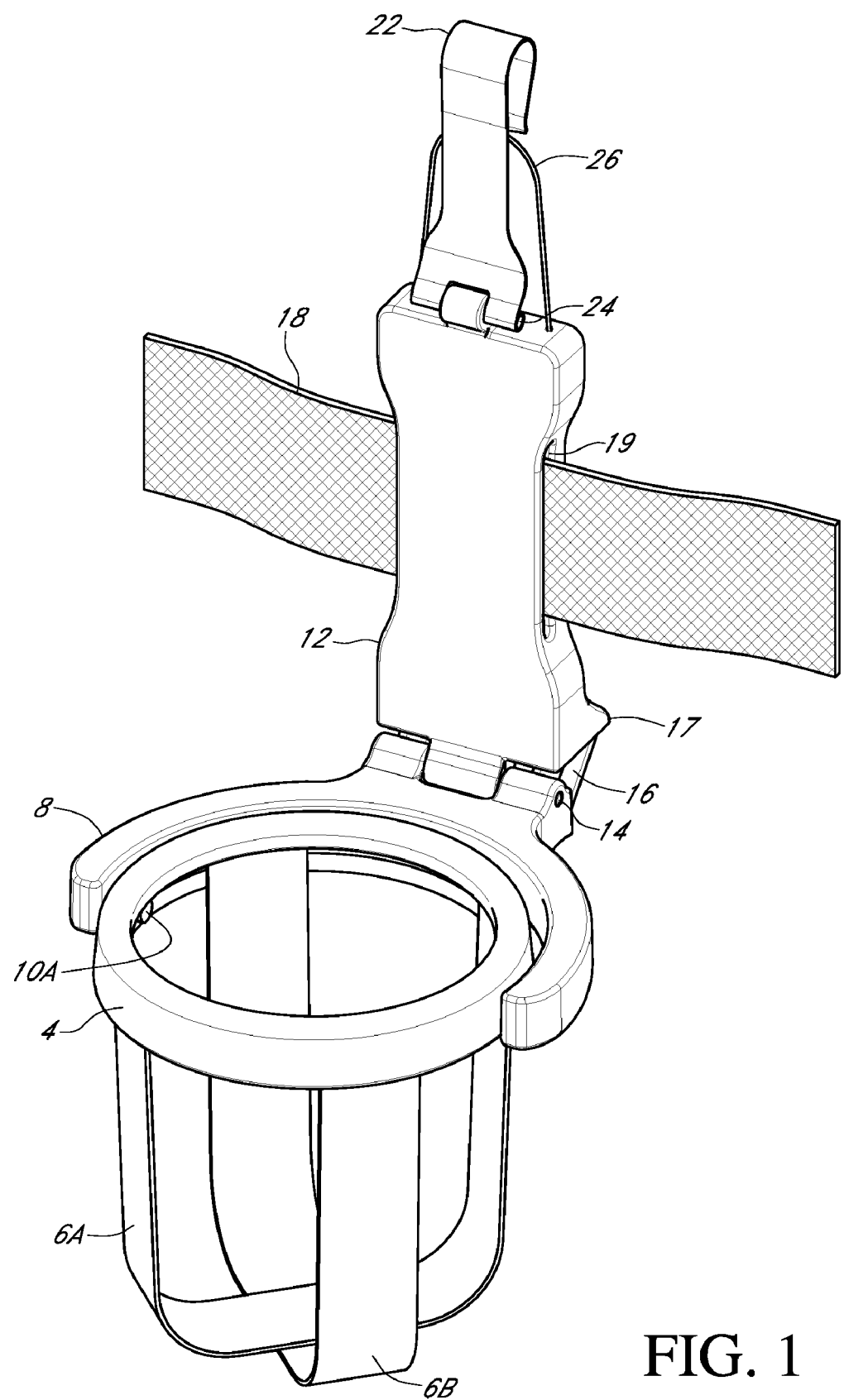
FIG. 1 is a perspective view of one embodiment of a portable holder for a beverage container.

The illustrative embodiments described in the detailed description, drawings, and claims are not meant to be limiting. As will be appreciated, the following detailed description is directed to certain specific embodiments. Other embodiments may be utilized, and other changes may be made, without departing from the spirit or scope of the subject matter presented here. The technology described herein can be embodied in a multitude of different ways. It will be readily understood that aspects of the present disclosure, as generally described herein, and illustrated in the figures, can be arranged, substituted, combined, and designed in a wide variety of different configurations, all of which are explicitly contemplated and make part of this disclosure. It is to be understood that the disclosed embodiments are not limited to the examples described below, as other embodiments may fall within disclosure and the claims.

Some embodiments are directed to holders for one or more beverage containers. A beverage container holder is a device that holds a beverage container or other drinking vessel. In some aspects, beverage container holders may include an insulative sleeve, for example, used to protect hands from the temperature of beverage containers with hot or cold beverages.

Some embodiments relate to making and using improved portable beverage container holders. For example, some embodiments relate to improved beverage container holders that can be temporarily or removably affixed to furniture including household or patio furniture as well as in a variety of vehicles, both motorized and non-motorized. Further, some embodiments relate to improved beverage container holders that can be used, for example, at sporting events or while a viewer watches television from an armchair.

Some embodiments relate to particular types of beverage container holders that may be used by travelers. Travelers may carry or place beverages in beverage container holders while waiting to board an airplane, when taking off in an airplane, while in the air and while landing in an airplane, while waiting to board a bus or taxi, while traveling in the bus or taxi, while in a ship or boat or when riding in other motorized or non-motorized vehicles. If no beverage container holder is available to the traveler then there may not be an optimal place for storing a beverage container. For example, when a plane flight is about to take off or land, travelers are required to "return tray tables to upright and locked position." At that time travelers who possess a beverage container have the option of setting the beverage container on the floor of the aircraft with an associated risk the container might be knocked over by an inadvertent foot or bag, or by movement of the aircraft. Travelers may also place a beverage container on their laps, but risk an uncomfortable and/or awkward moment should the beverage spill from the container.

Embodiments are directed to portable holders for beverage containers. Portable holders can be easily transported from a first location to a second location and may be used at both the first location and the second location or in transit thereto for holding beverage containers. Thus, in some embodiments, a portable holder for a beverage container can be temporarily or removably attached to a moving vehicle, an airplane seat, a waiting room chair, a bicycle or mechanized non-motorized vehicle, a folding chair, arm chair, couch, countertop or any other stationary furniture. Embodiments may also be used in a variety of other places including in a place of work, in a garage, in an office or in a kitchen.

In one preferred embodiment, a portable holder for a beverage container can include, for example, a basket suspended from a first movable position piece, wherein the basket is configured to hold a beverage container placed thereon. In some embodiments, the basket can be attached to the movable position piece by an adhesive, a screw, a pin, a staple, a knot, a glue, a weld or any other suitable method, for example.

As used herein, without being limited thereto, a basket can be a container apparatus, for example, constructed from fibers of wood or plant materials, metal, ceramic, plastic, wire mesh, including synthetic fiber or plastic material (e.g., plastic, nylon) or any other suitable material configured to support a beverage container placed therein. A basket may also be constructed from one or more overlapping straps, for example. The "basket" can be a continuous or single piece of material or discontinuous and or more than one piece of material. The basket may also be configured to support, secure and stabilize a container placed therein. A strap can be an elongated flap or ribbon, which usually comprises fabric, leather, cloth, rubber, plastic, metal or some other suitable material with sufficient strength to form part of a beverage container holder. Other configurations besides a "basket" as described above can be used. In view of this disclosure, one of skill in the art will appreciate that any configuration can be used that supports, secures or holds a container in place. For example, such support or securing mechanisms can include a single semi-rigid piece attached at one point to the first movable position piece, where the semi-rigid piece has enough structure to support, secure or stabilize a beverage container placed thereon.

FIG. 1 is a perspective view of one embodiment of a portable holder for a beverage container. In this embodiment a first movable position piece 4 is attached to a basket configured to hold a beverage container placed thereon. Beverage containers that may be held by the basket include, for example, a cup or a bottle. The basket includes two straps 6A, 6B. The straps 6A and 6B can include, for example, a flexible material such that they may be folded or collapsed when not in use.

The first movable position piece 4 of the holder for beverage containers is attached to a first plate 8 via a pin 10A and a pin 10B (not visible in FIG. 1). A pin may include, for example, a screw, a nail, a button or other suitable connection to connect piece 4 to first plate 8. In some aspects the pin or connector may be configured to permit the first movable position piece 4 to rotate with respect to the first plate 8. It should be noted that although the word "plate" is used to designate the component 8 (and other components described herein), the word plate is not meant to be limiting as to the structure, geometry or characteristic of the respective components. Further, although the first movable position piece 4 is attached to the first plate 8 at two locations via a pin 10A and a pin 10B, in some embodiments of a portable holder for beverage containers the first movable position piece 4 is rotatably attached to a first plate 8 at only a single location.

Further, although the first movable position piece 4 illustrated in this embodiment includes a substantially circular shape, any appropriate shape for a holder for beverage containers is contemplated.

In some embodiments not illustrated in FIG. 1, the first movable position piece 4 and the first plate 8 are combined into a single structure. The single structure formed by the combination of the first movable position piece 4 and the first plate 8 does not have the benefit of permitting the first movable position piece 4 to rotate with respect to the first plate 8, but nevertheless can function in other respects similar to the embodiment illustrated in FIG. 1. For example, the single structure formed by the combination of the first movable position piece 4 and the first plate 8 is, like the embodiment illustrated in FIG. 1, configured to hold a basket, which in turn is configured to hold a beverage container placed thereon.

In some embodiments not illustrated in FIG. 1, the first movable position piece 4 may not fully circumnavigate a beverage container held in the beverage container holder. For example, the first movable position piece 4 may comprise an incomplete circular shape.

The first plate 8 is connected to a second plate 12 by a hinge that includes a rod 14. The hinge can be a type of bearing that allows, for example, only a limited angle of rotation between the first plate 8 and the second plate 12. In some aspects the hinge can be configured to lock into any angle of rotation without being limited to any particular angle. The rod 14 may be or include a pin, a screw, a nail, a button or other suitable connection that can allow functional rotation of the hinge. In other embodiments the hinge can include a flexible material.

A second movable position piece 16 contacts the first plate 8 and is attached to a foot or base 17 of the second plate 12. In a first position, the second movable position piece 16 can prevent the hinge between the first plate and the second plate from opening to an angle greater than about 90 degrees, for example. In some embodiments the term "about" as used here and elsewhere herein can include plus or minus 10% of the value indicated. In some embodiments the term about includes plus or minus 5% of the value indicated. In some embodiments the term about includes plus or minus 2% of the value indicated. It should be understood that in some aspects, the hinge 14 and second moveable position piece 16 can be replaced by any other mechanism that can secure the first plate 8 at a desired angle to relative to the second plate 12. For example, plate 8 and/or plate 12 can be configured such that their relative angle does not exceed a desired amount, for example about 90 degrees or about 180 degrees.

In some embodiments the second movable position piece 16 is rotatably connected to the first plate 8. When the second movable position piece 16 is in a first position, the second movable position piece 16 contacts the second plate 12 only when the hinge between the first plate 8 and the second plate 12 is opened to a specific angle. As will be discussed further below with regard to FIG. 7A, when the second movable position piece is in a second position, the hinge between the first plate and the second plate is allowed to open to an angle of about 180 degrees.

FIG. 1 further illustrates a flexible strap 18, which can be connected to the second plate 12 by passing through a hole (opening or aperture) 19 in the second plate 12. Although a flexible strap 18 is depicted in FIG. 1, it should be understood that a rigid or semi-rigid member may be used. Further, it should also be understood that although flexible strap 18 is illustrated in FIG. 1 as connected to the second plate 12 by passing through the hole 19 in the second plate 12, any suitable attachment mechanism can also be used can to attach the flexible strap 18 to the second plate 12, (e.g., through a hole or by any other suitable method, screws, rivets, glue, etc.). Further, although only one flexible strap 18 is illustrated in FIG. 1, more than one flexible strap 18 may be connected to the second plate 12. As will be discussed further below with regard to FIGS. 7A and 7B, the flexible strap 18 can be configured to attach the portable holder for a beverage container to a stationary object or to a vehicle. For example, the flexible strap 18 can be configured to attach the portable holder to a vertical member when the hinge between the first plate 8 and the second plate 12 is opened to about 90 degrees, and the flexible strap 18 can be configured to attach the portable holder to a horizontal member when the hinge between the first plate 8 and the second plate 12 is opened to about 180 degrees. Also, the portable strap can be configured to attach or secure the holder to members with angles that are not strictly vertical or horizontal, where the angle between 8 and 12 is, for example between 180° and 60° or preferably 180°-90°.

FIG. 1 also illustrates a hanging member configured to support the weight of the portable holder for a beverage container when the portable holder is suspended therefrom. The embodiment illustrates two hanging members. A first hanging member can be a hook 22 attached to the second plate 12 by a hinge that includes a pin 24. The hinge between the second plate 12 and the hook 22 allows the hook 22 to rotate with respect to the second plate 12. A second hanging member is a loop 26 attached to the second plate 12. The loop 26 is attached to the second plate 12 at two locations and is configured to allow a user to hang the portable holder for a beverage container. In other embodiments the loop 26 is attached to the second plate 12 at a single location. It should be noted that although a hinge is depicted, other components or configurations can be utilized which permit the device to rotate or move relative to the component 12. For example, the hanging member can be made of a flexible or elastic material, can be connected via a ball and socket type connection (can permit rotation in more than one plane), and the like.

One of ordinary skill in the art, informed by the disclosure herein, would be enabled to make or construct the embodiments disclosed with regard to FIG. 1, or any of the FIGS. 2-12 discussed below. For example, in one aspect a method of making a beverage container holder may include attaching a first plate 8 to a first movable position piece 4, wherein the first movable position piece 4 may be configured to hold a beverage container placed therein; and attaching a second plate 12 the first plate.

Figure 2:
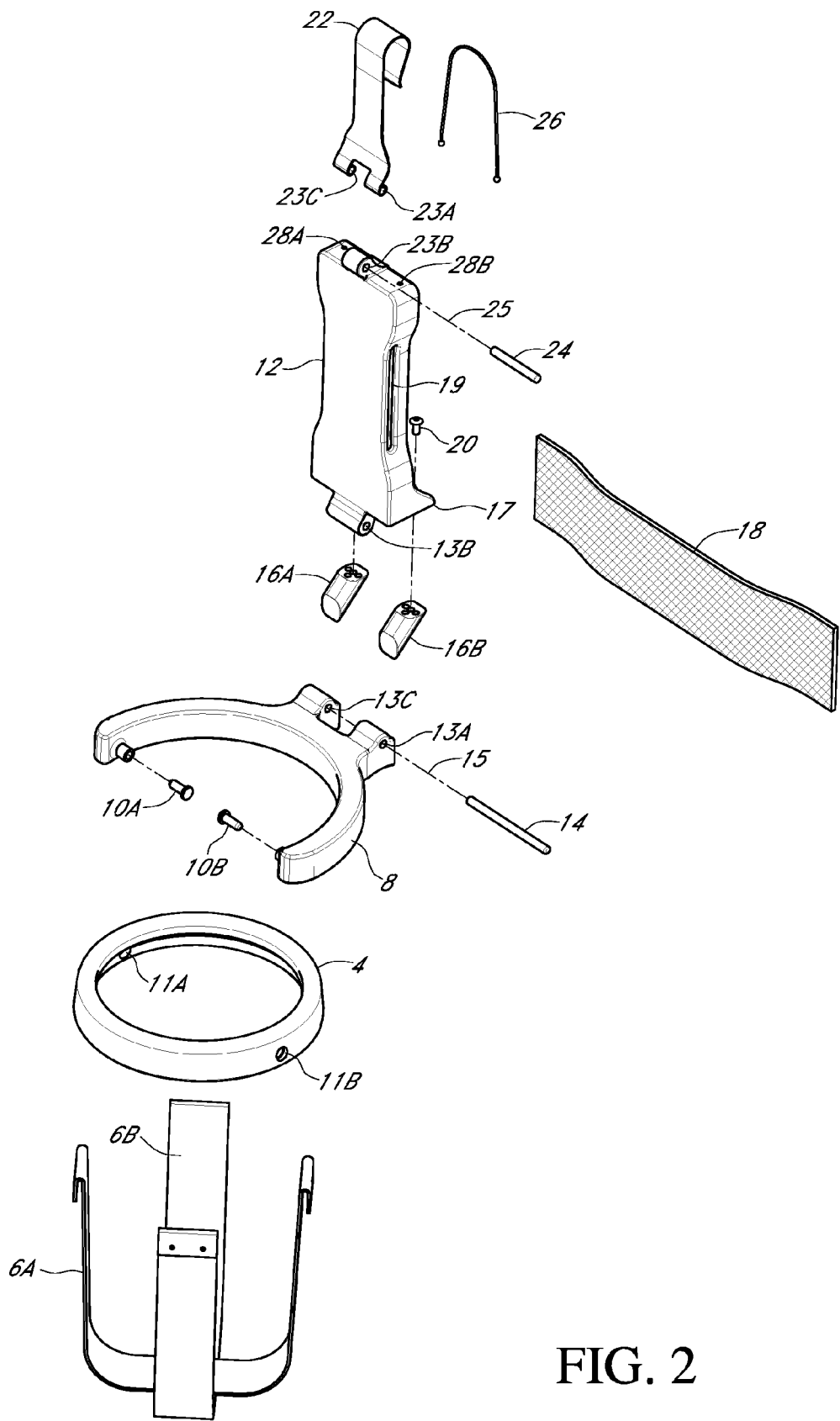
FIG. 2 is an exploded view of the portable holder for a beverage container illustrated in FIG. 1.

FIG. 2 is an exploded view of the portable holder for a beverage container. The exploded view illustrates that the basket can include two straps 6A and 6B. The two straps 6A and 6B can be folded to attach to the inside surface of the first movable position piece 4. Straps 6A and 6B may additionally be secured to the rim in one or a number of ways, which include, but are not limited to, staples, pins, tacks, screws, nails or suitable adhesives. The first movable position piece 4 can be attached to the first plate 8 by pins or screws 10A and 10B that fit through rim holes 11A and 11B (respectively) before attaching to the first plate 8.

The hinge connecting the first plate 8 to the second plate 12 can include, for example, a pin 14 that passes through hole 13A in the first plate 8 along a line 15 before the rod 14 passes through hole 13B in the second plate 12 and hole 13C in the first plate 8. Second movable position pieces 16A and 16B may allow manipulation of the hinge between the first plate 8 and the second plate 12. More specifically, when either or both of second movable position pieces 16A and 16B are put in a first position, they can allow the hinge between the first plate 8 and the second plate 12 to open to about 90 degrees.

When, however, both of second movable position pieces 16A and 16B are in a second position, the hinge between the first plate 8 and the second plate 12 may open to approximately 180 degrees. Here, movable position piece 16B can be attached to a foot or base 17 of the second plate 12 by a pin 20. In some embodiments the pin 20 may include a screw/nut combination. In other embodiments the pin 20 may include, for example, a pop rivet, staple, pin, tack, screw, nail or other suitable attachment. The foot or base 17 can be a protrusion on one end of the second plate 12. A pin, which is similar or identical to the pin 20, attaches position piece 16A to the foot 17 of the second plate 12. When both the second movable position pieces 16A and 16B are in a second position, the hinge between the first plate 8 and the second plate 12 may open to approximately 180 degrees because the hinge is stopped from opening further by the foot 17 coming into contact with the first plate 8. In some aspects the position pieces 16 can be separate components from the first plate 8 or the second plate 12, while in other aspects the pieces 16 can be integral with or part of the first plate 8 or the second plate 12. In some aspects the position pieces 16A/B can be a single piece rather than two (or more) pieces as illustrated in FIG. 2.

As mentioned above, a hinge can connect the hook 22 to the second plate 12. The hinge between the hook 22 and the second plate 12 is formed by a rod 24 passing through a hole 23A in the hook 22, a hole 23B in the second plate 12 and a hole 23C in the hook 22 along a line 25. Additionally, the exploded view of FIG. 2 illustrates the connection of the loop 26 at junctures 28A and 28B on second plate 12. In some aspects the beverage container holder can include both the hook 22 and the loop 26, while in other aspects the holder can include one or the other or neither. As noted above, although a hinge and loop are depicted, other devices can be used such as ball and sockets, flexible materials that attach, and the like.

Figure 3:
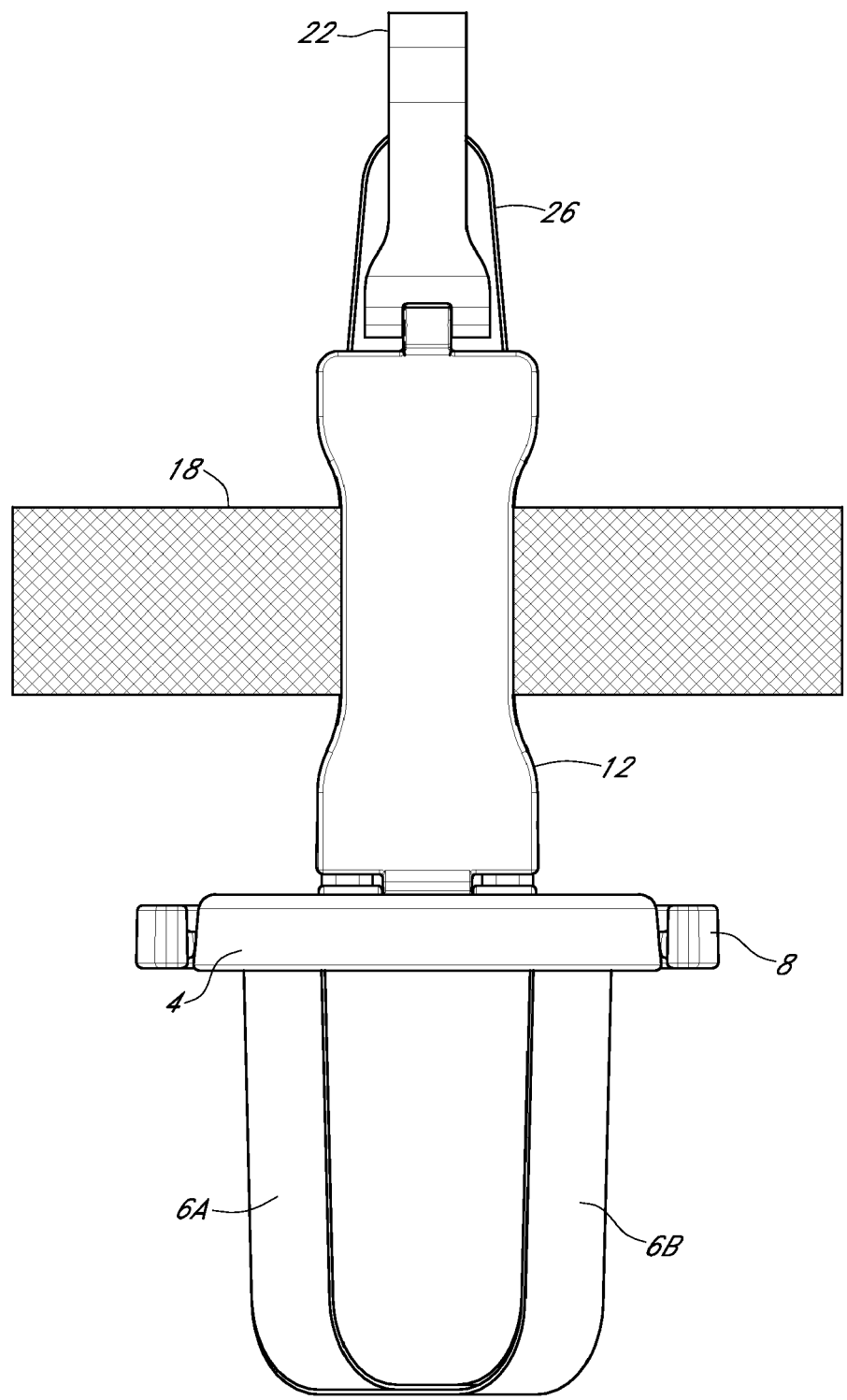
FIG. 3 is a front view of a portable holder for a beverage container.

FIG. 3 is a front view of the embodiment of FIG. 1. The basket includes a strap 6 configured to hold a beverage container therein. The strap 6 may include one or more pieces of suitable material. The strap 6 may be a continuous piece of material attached in multiple places to the first movable position piece 4 or the strap 6 may be attached in a single place to the first movable position piece 4. In some embodiments the strap 6 can include a flexible material that can be easily folded, for example, to occupy the volume between the sides of the first movable position piece 4 and the first plate 8. As such, it the device can be more compactly stored. In some embodiments the holder is configured to fold into a volume less than $1 \times 3 \times 3$ in$^3$.

Figure 4:
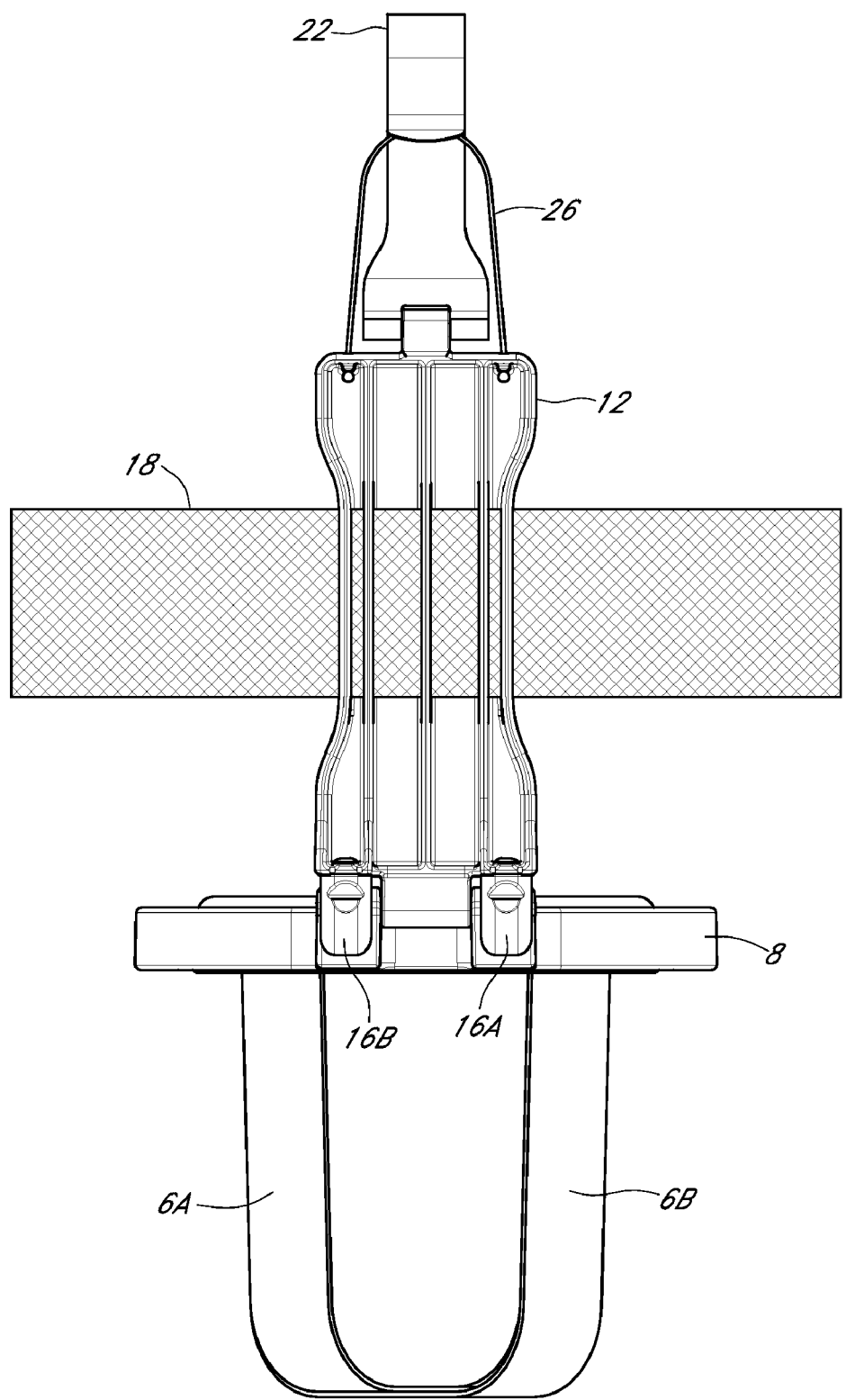
FIG. 4 is a back view of the portable holder for a beverage container illustrated in FIG. 3.

FIG. 4 is a back view of the embodiment of FIG. 1. The flexible strap 18 passes through the second plate 12. In some embodiments the flexible strap 18 can be attached by other means to the second plate 12. Such methods of attachment might include, for example, staples, glue, screws, rivets, etc. The second plate 12 is illustrated as a semi-solid structure. The second plate 12 may include a semi-solid structure or a lightweight material of sufficient strength to fulfill its intended purpose. In some aspects, one benefit to the semi-solid structure and/or to construction with a lightweight material is an overall reduction in the weight of the portable holder for a beverage container. In some embodiments the holder for beverage containers can be configured to weigh less than 10 oz., less than 6 oz., less than 5 oz., less than 4 oz., less than 3 oz. or less than 2 oz., for example.

Figure 5:
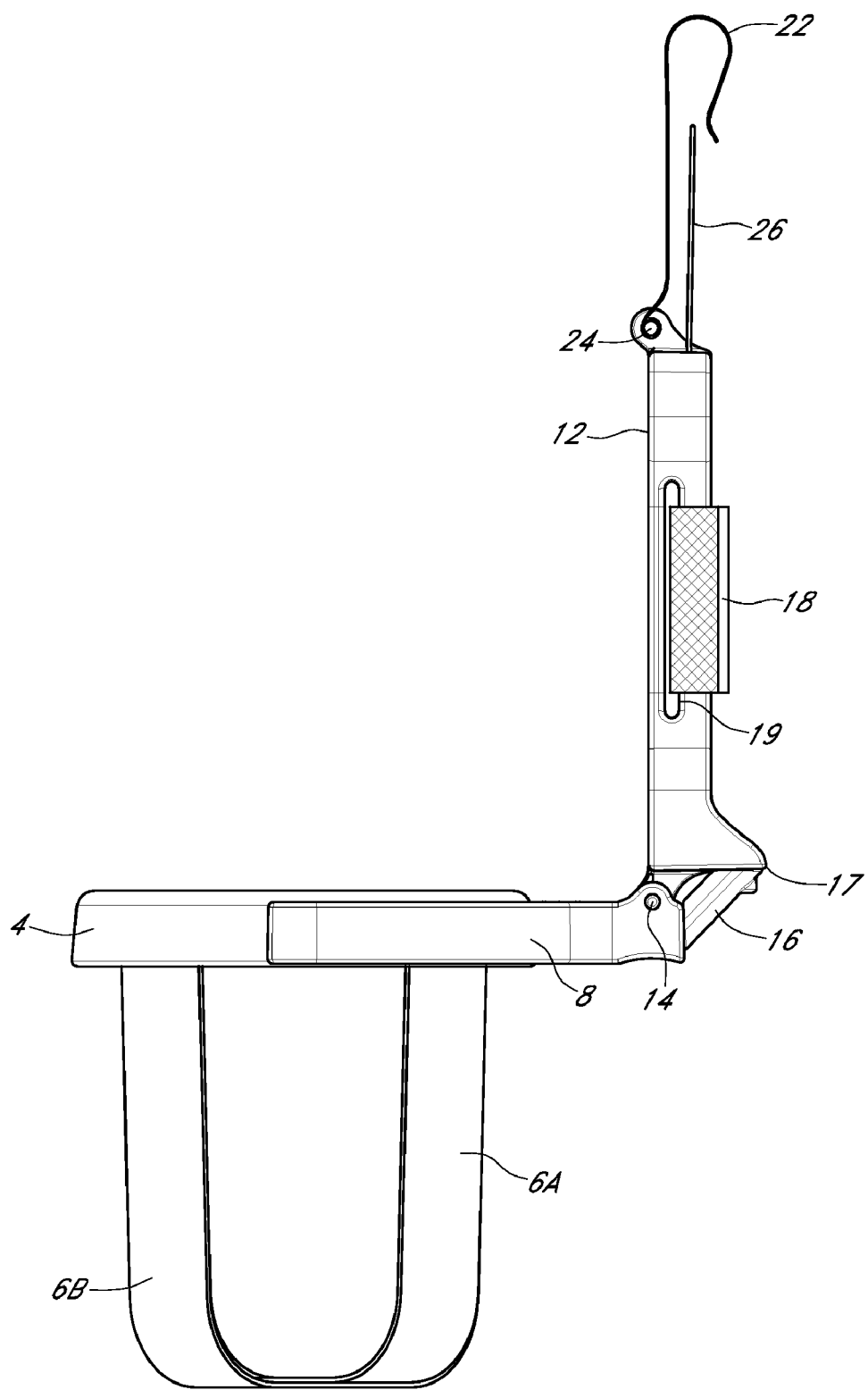
FIG. 5 is a side view of the portable holder for a beverage container illustrated in FIG. 3.

FIG. 5 is a side view of the embodiment of FIG. 1. The side view illustrates the hinge attaching the hook 22 to the second plate 12. As mentioned briefly above, the hook 22 is one type of hanging member configured to allow the portable holder for beverage containers to be suspended therefrom. For example, the hook 22 is configured to suspend the portable holder for a beverage container from an airplane tray table when the airplane tray table is in an upright and locked position. The side view also illustrates the hinge attaching the first plate 8 to the second plate 12. The second movable position piece 16 is in a first position bracing the foot 17 of the second plate 12 against the side of the first plate 8. Thus, when it is in a first position the second movable position piece 16 prevents the hinge between the first plate 8 and the second plate 12 from opening past about 90 degrees.

FIG. 6A is a top view of the embodiment of FIG. 1. The top view illustrates a top view of the pins 20A and 20B. The pins 20A and 20B pass through the foot 17A and 17B, respectively, and attach the second movable position pieces 16A and 16B (not shown) to the second plate 12. In some embodiments the pins 20A and 20B can include a combination of screws and nuts. In other embodiments the pins 20A and 20B may include any other suitable attachments.

As noted above, although this embodiment includes a "basket" for holding or supporting a beverage container that is substantially circular, other geometries for a basket are also contemplated and with in the scope of the embodiments. For example, some beverage containers can be elliptical, multifaceted (for example, octagonal, etc.) or rectangular shaped. Thus, in some embodiments, the basket can be configured such that elliptical, multifaceted or rectangular shaped beverage containers are held securely. Further, although the illustrated embodiment includes crossed straps configured to support a beverage container, other configurations are also possible. For example, a single strap or more than two straps might be configured to support or secure a beverage container placed thereon. Another example is one or more rigid members attached to the portable holder for beverage containers at one or more locations such that the one or more rigid members are configured to support or secure a beverage container placed thereon. A rigid member may include one or more materials such as plastic, metal or other suitable materials for the rigid member.

FIG. 6B is a bottom view of the embodiment of FIG. 1. The pins 20A and 20B are illustrated attached through the second movable position pieces 16A and 16B, respectively. The first plate 8 is illustrated as a semi-solid structure. In some embodiments the first plate 8 may include a lightweight material. The semi-solid structure or lightweight material of first plate 8 can allow for an overall reduction in the weight of the portable holder for a beverage container. As noted above, the holder for a beverage container may weigh less than 10 oz., less than 6 oz., less than 5 oz., less than 4 oz., less than 3 oz., or less than 2 oz., for example.

Figure 7A:
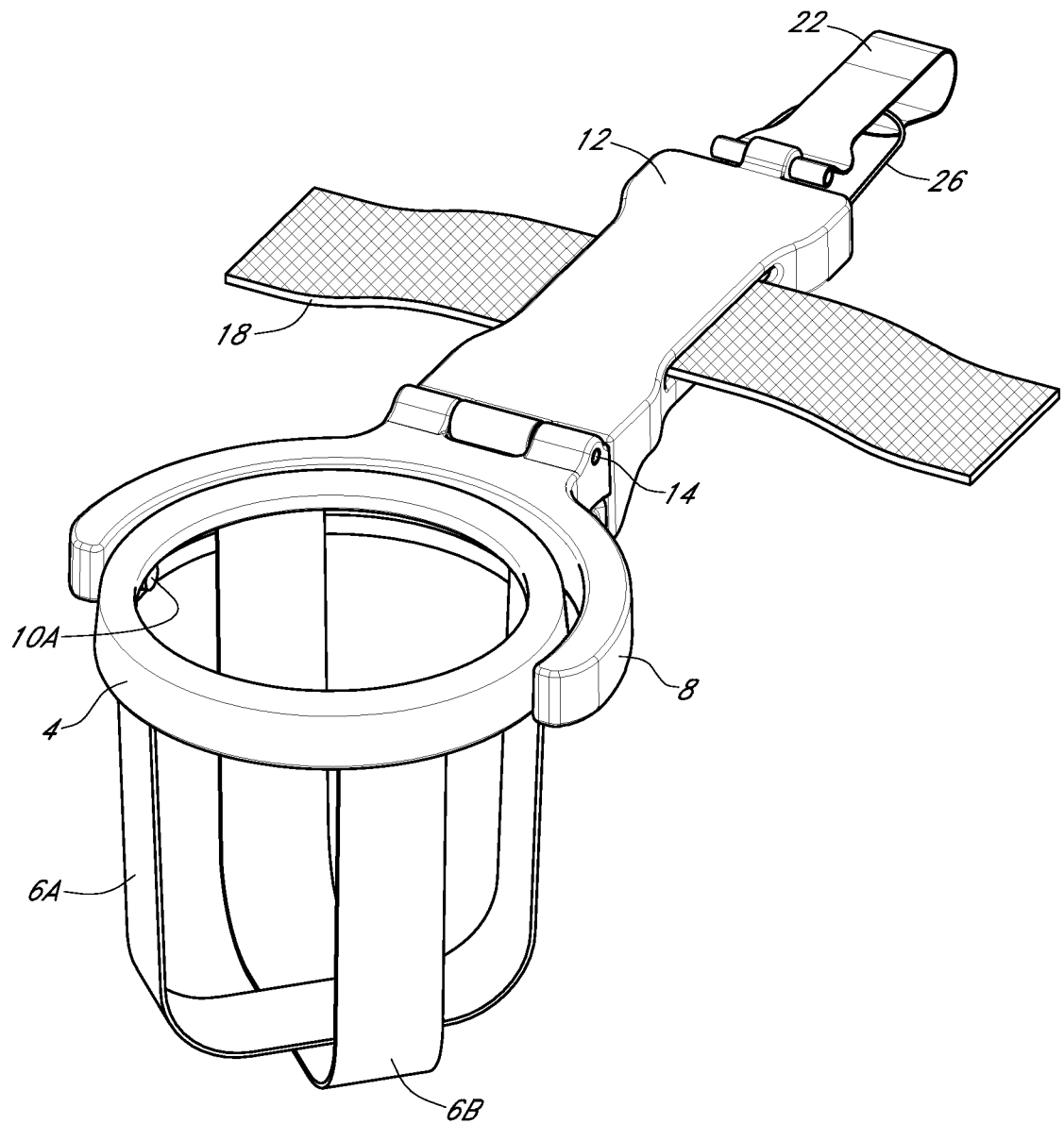
FIG. 7A is a perspective view of a portable holder for a beverage container with a second plate deployed 180 degrees from a first plate.

FIG. 7A is a perspective view of a portable holder for beverage containers with the hinge between the first plate 8 and the second plate 12 open to about 180 degrees. In the depicted embodiment, the hinge does not open further than about 180 degrees because the foot 17 or other portion of the second plate 12 contacts a side of the first plate 8. It should be appreciated that in some aspects, the hinge can be adjusted beyond/below 180°. In this position, the flexible strap 18 may be used to temporarily attach the second plate 12 to a semi-horizontal member, such as an arm of a chair. In this particular depicted embodiment the flexible strap 18 comprises a suitable flexible material and may employ a knot, buckle, snap, adhesive, string, Velcro™ or other suitable attachment to the semi horizontal member.

Figure 7B:
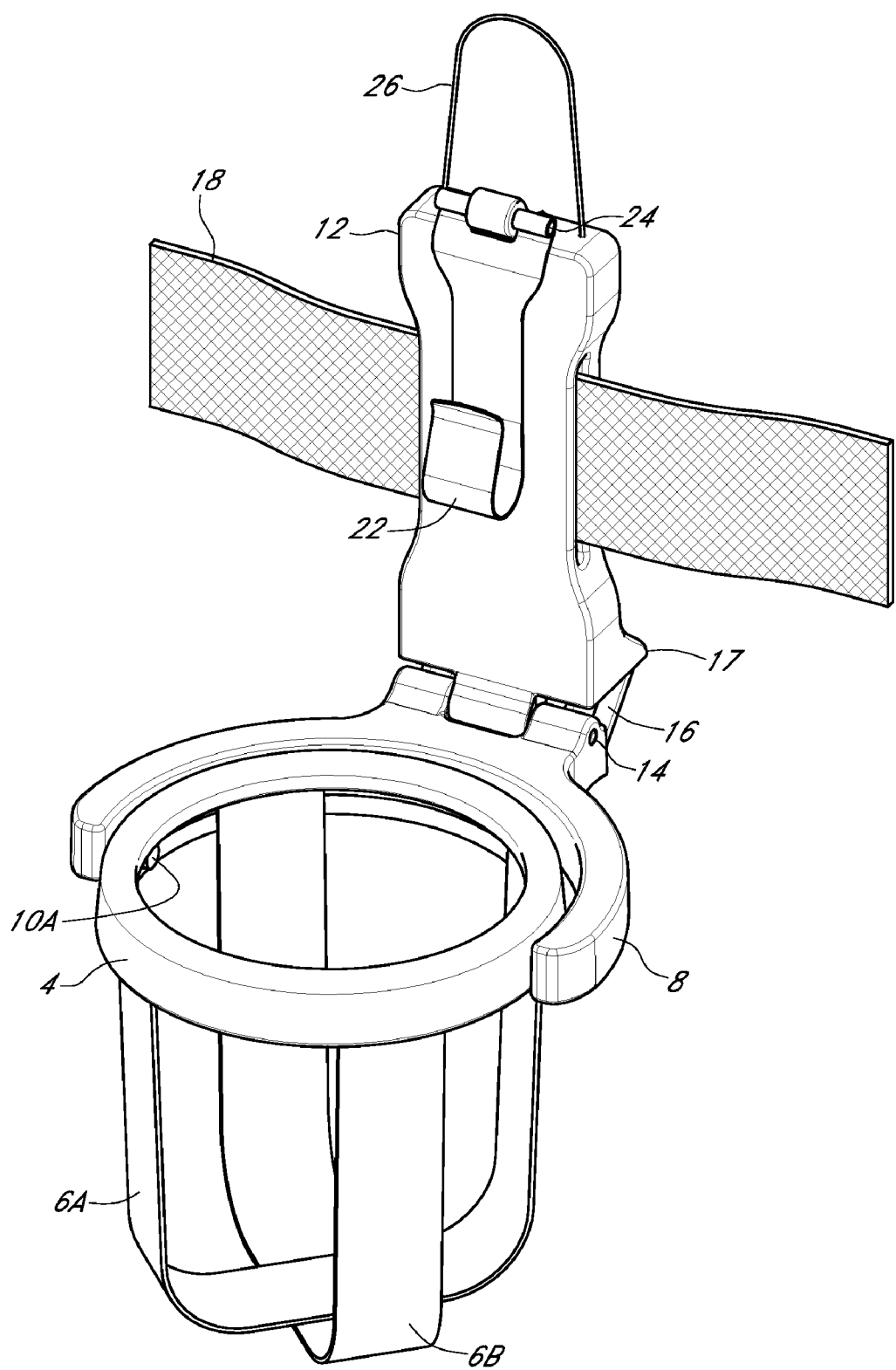
FIG. 7B is a perspective view of a portable holder for a beverage container with a second plate deployed 90 degrees from a first plate and a hook folded along a hinge attachment to the second plate.

FIG. 7B is a perspective view of a portable holder for beverage containers. The second movable piece 16 is in a first position such that the hinge between the first plate 8 and the second plate 12 is open to about 90 degrees. The hook 22 is folded along the hinge connecting the hook 22 with the second plate 12. In this position, the folded hook 22 is approximately parallel to the second plate 12. The loop 26 connected to the second plate 12 is deployed for use. As noted above, the loop 26 is a hanging member configured hold the weight of the portable holder for beverage containers therefrom. In some embodiments, the loop 26 also can be configured to support the weight of a beverage container full of a beverage placed in the holder for beverage containers.

Similar to the example described above with regard to the hook 22, a passenger on an aircraft may use the loop 26 to hold a beverage container. The passenger may place the loop 26 over the lock (or other knob) on the back of the airplane seat tray table and thus suspend the portable holder, including the beverage container and any beverage contained therein.

A passenger might also use the strap 18 to anchor the portable holder for a beverage container, which is positioned as in FIG. 7B with the hinge between the first plate 8 and the second plate 12 at an angle of about 90 degrees. In this position the strap 18 may attach the second plate 12 to a vertical member. In some embodiments, where the strap comprises a Velcro™ material, the strap 18 may be wrapped around vertical members of varying widths.

Figure 7C:
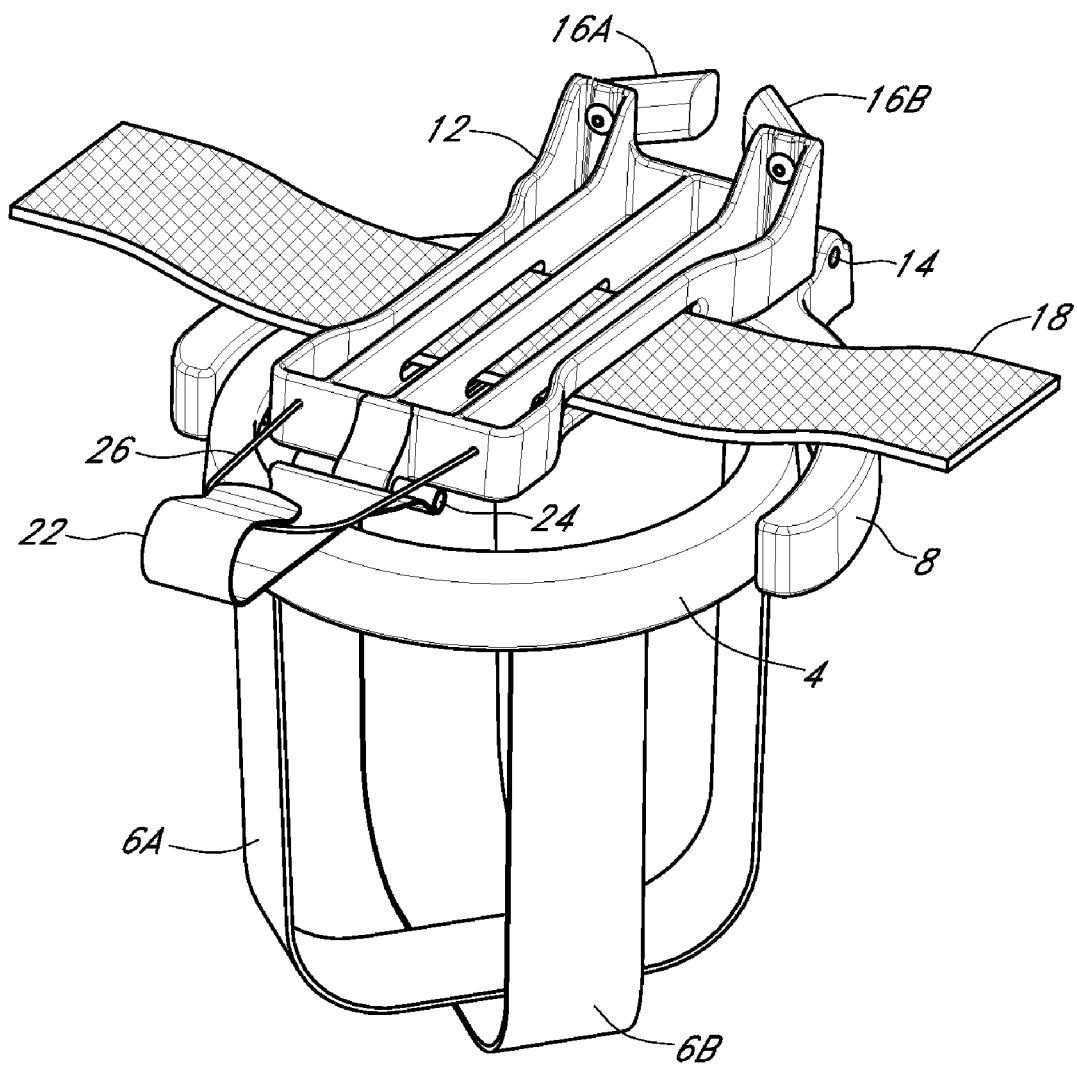
FIG. 7C is a perspective view of a portable holder for a beverage container with a second plate folded along a hinge connection to a first plate.
Figure 7D:
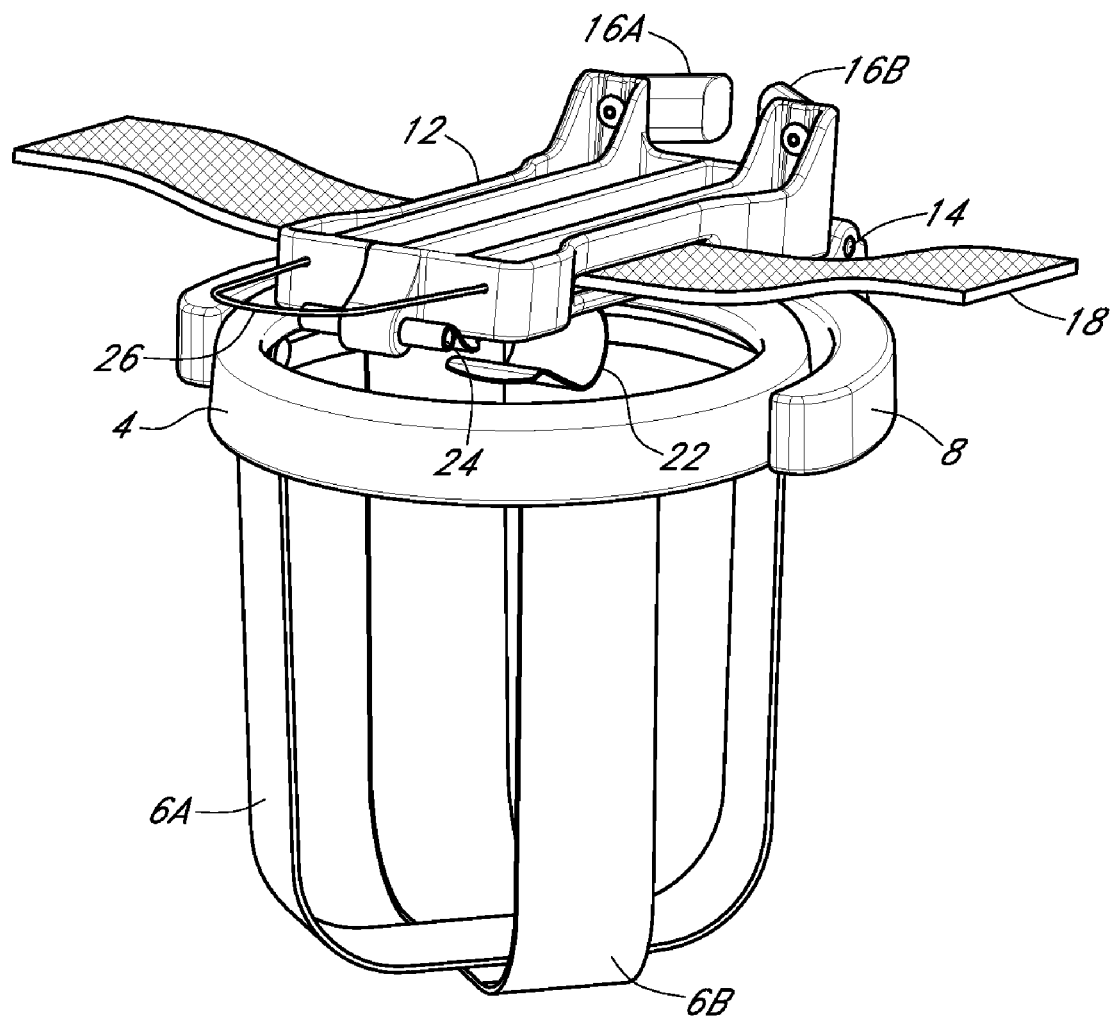
FIG. 7D is a perspective view of a portable holder for a beverage container with a hook folded under a second plate, which is folded along a hinge connection to a first plate.

FIG. 7C is a perspective view of a portable holder for beverage containers with the second plate 12 folded along the first hinge connection to the first plate 8. In this partially collapsed position the holder for beverage containers is easily portable in a pocket, briefcase or other container. This allows the portable holder for beverage containers to be easily packed when traveling. As illustrated in FIG. 7D, the portable holder may be further collapsed by folding the hook 22 along the hinge connection between the hook 22 and the second plate 12 such that the hook 22 is in a position substantially parallel to the second plate 12 before folding the second plate along the hinge connecting the first plate 8 and the second plate 12. Further, as mentioned above, the straps 6A and 6B as well as the strap 18 may comprise a flexible material such that they may be folded into a smaller volume, furthering compressing the folded portable holder for beverage containers so that the portable holder may be placed in a pocket, purse, suitcase, pouch or similar container for ease of portability during travel.

Figure 8:
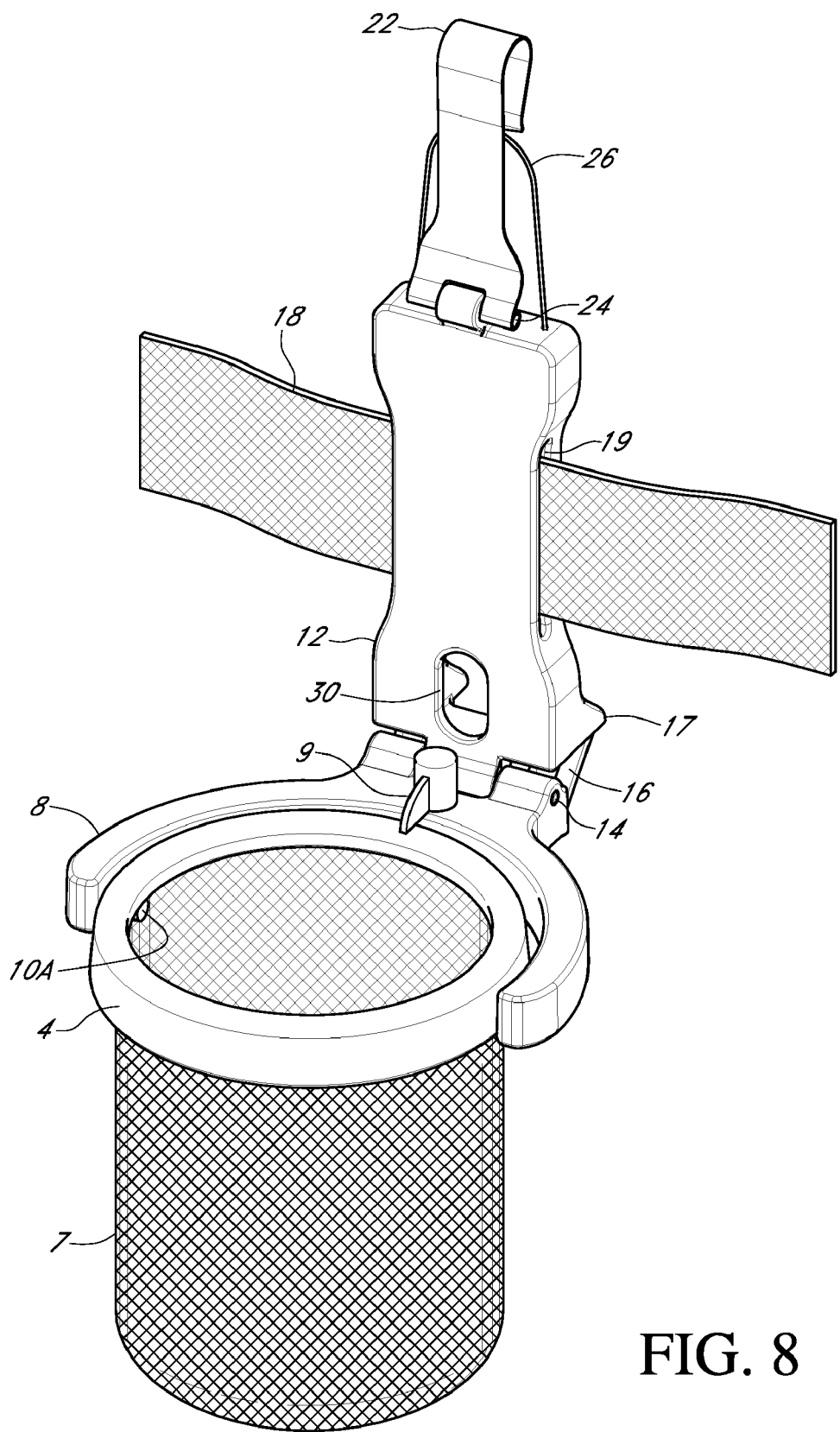
FIG. 8 is a perspective view of another embodiment of a portable holder for a beverage container.

FIG. 8 is a perspective view of another embodiment of a portable holder for a beverage container. The basket includes a mesh material 7 configured to hold or support a beverage container placed therein. In some embodiments the mesh material 7 can include a flexible material configured to collapse into the smaller volume between sides of the first plate 8. In some embodiments the mesh material 7 can be configured to hold beverage containers of varying sizes and shapes therein. As noted above, the first movable position piece 4 can be configured to rotate about pins 10A and 10B (not shown), which attach the first movable position piece 4 to the first plate 8.

FIG. 8 illustrates a third movable position piece 9 attached to the first plate 8. In some embodiments the third movable position piece 9 can be permanently fixed in a first position to prevent the first movable position piece 4 from rotating past horizontal with respect to the first plate 8. In some embodiments the third movable position piece 9 may rotate to a second position to allow the first movable position piece 4 to rotate past horizontal with respect to the first plate 8. When in a first position, the third movable position piece 9 can prevent the first movable position piece 4 and the basket attached thereto from tipping a beverage container held in the basket past horizontal, away from the second plate 12 and spilling a beverage in the beverage container. As discussed with regard to FIGS. 10C and 10D, the second plate 12 can include a hole 30 to allow uninterrupted folding of the second plate 12 about the hinge connecting the second plate 12 to the first plate 8. Although the third movable position piece 9 is shown in connection with the embodiment depicted by FIG. 8, it should be appreciated that the third movable position piece 9 can be optionally included with various embodiments of the device of FIG. 8 and can be excluded from other embodiments of the device of FIG. 8. Also, it should be noted that the third movable position piece optionally can be used with any of the embodiments described herein, including the embodiments already discussed in connection with FIGS. 1-7, for example.

Figure 9:
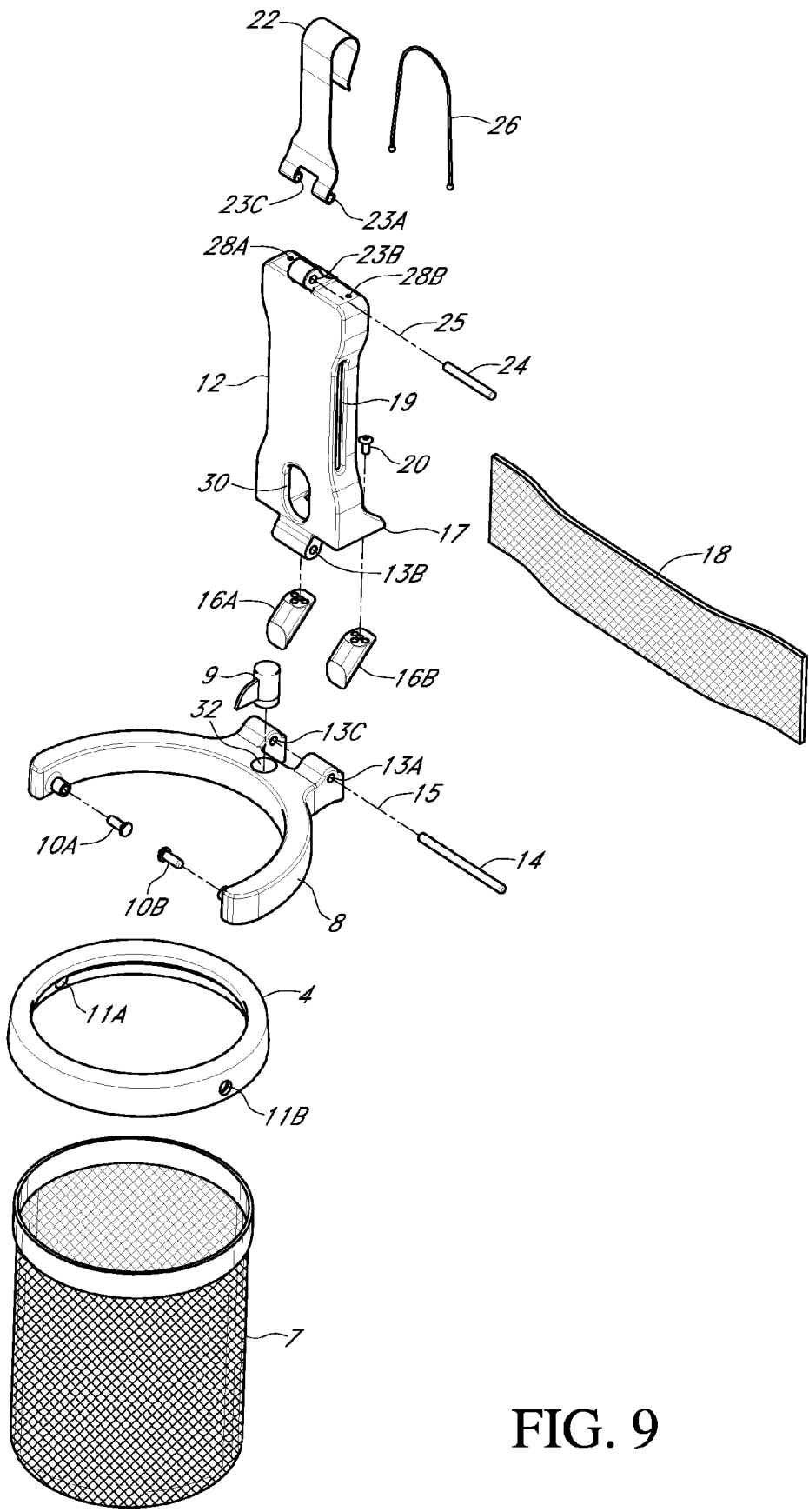
FIG. 9 is an exploded view of the portable holder for a beverage container illustrated in FIG. 8.

FIG. 9 is an exploded view of the portable holder for beverage containers illustrated in FIG. 8. The third movable position piece 9 attaches to the first plate 8 at a position 32. In some embodiments the third movable position piece may be permanently attached to the position 32 on the first plate 8 such that no rotation is possible. In other embodiments, the third movable position piece 9 can be rotatably attached to the position 32.

Figure 10A:
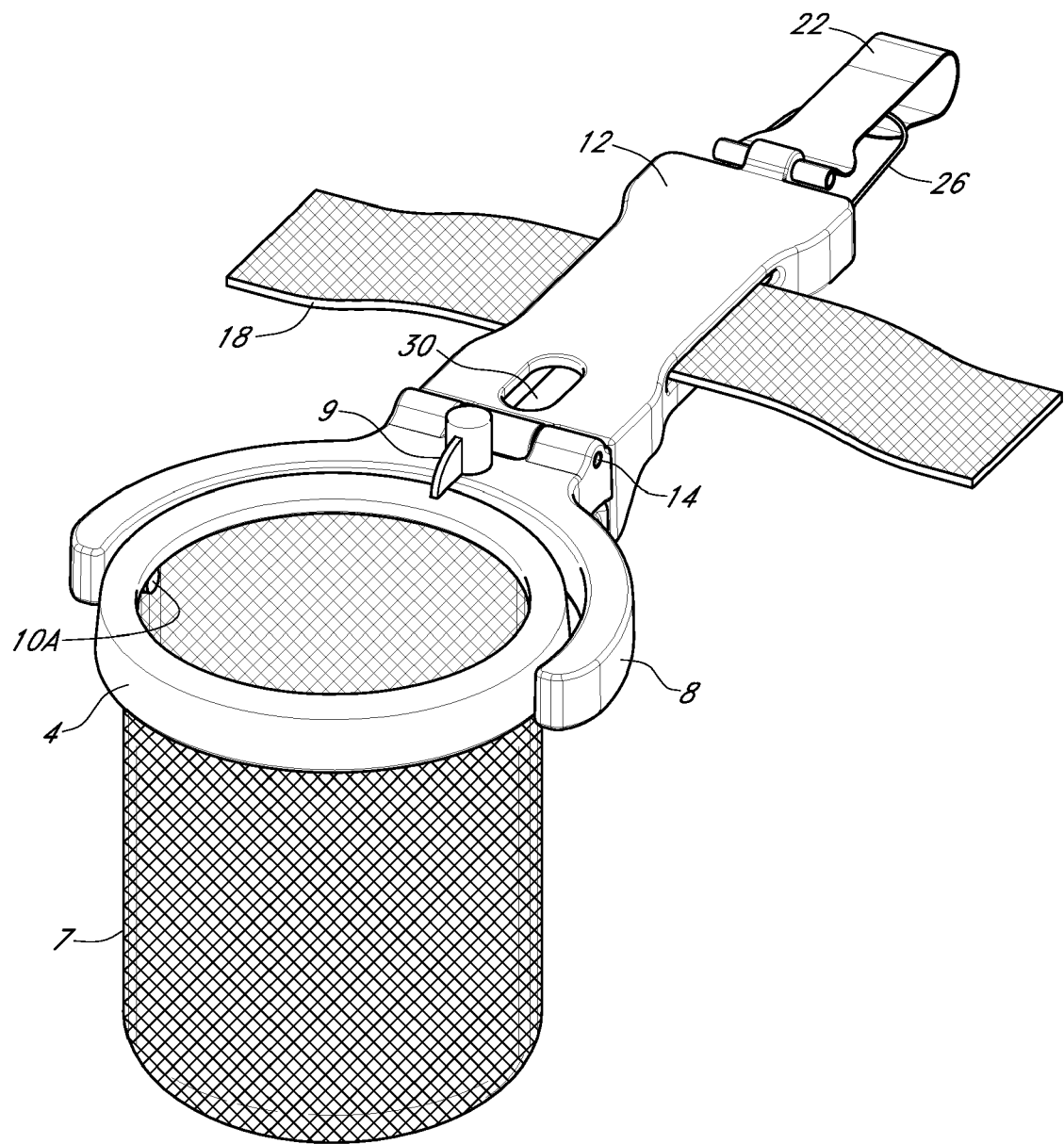
FIG. 10A is a perspective view of a portable holder for a beverage container with a second plate deployed 180 degrees from a first plate.

FIG. 10A is a perspective view of a portable holder for a beverage container with the second plate 12 deployed about 180 degrees from the first plate 8. In this position, basket 7 is deployed to hold a beverage container and the flexible strap 18 may attach second plate 12 to a semi-horizontal member. Although the first movable position piece 4 is configured to rotate with respect to first plate 8 about pins 10A and 10B, the third movable position piece 9 prevents the first movable position piece 4 from rotating past horizontal with respect to first plate 8.

Figure 10B:
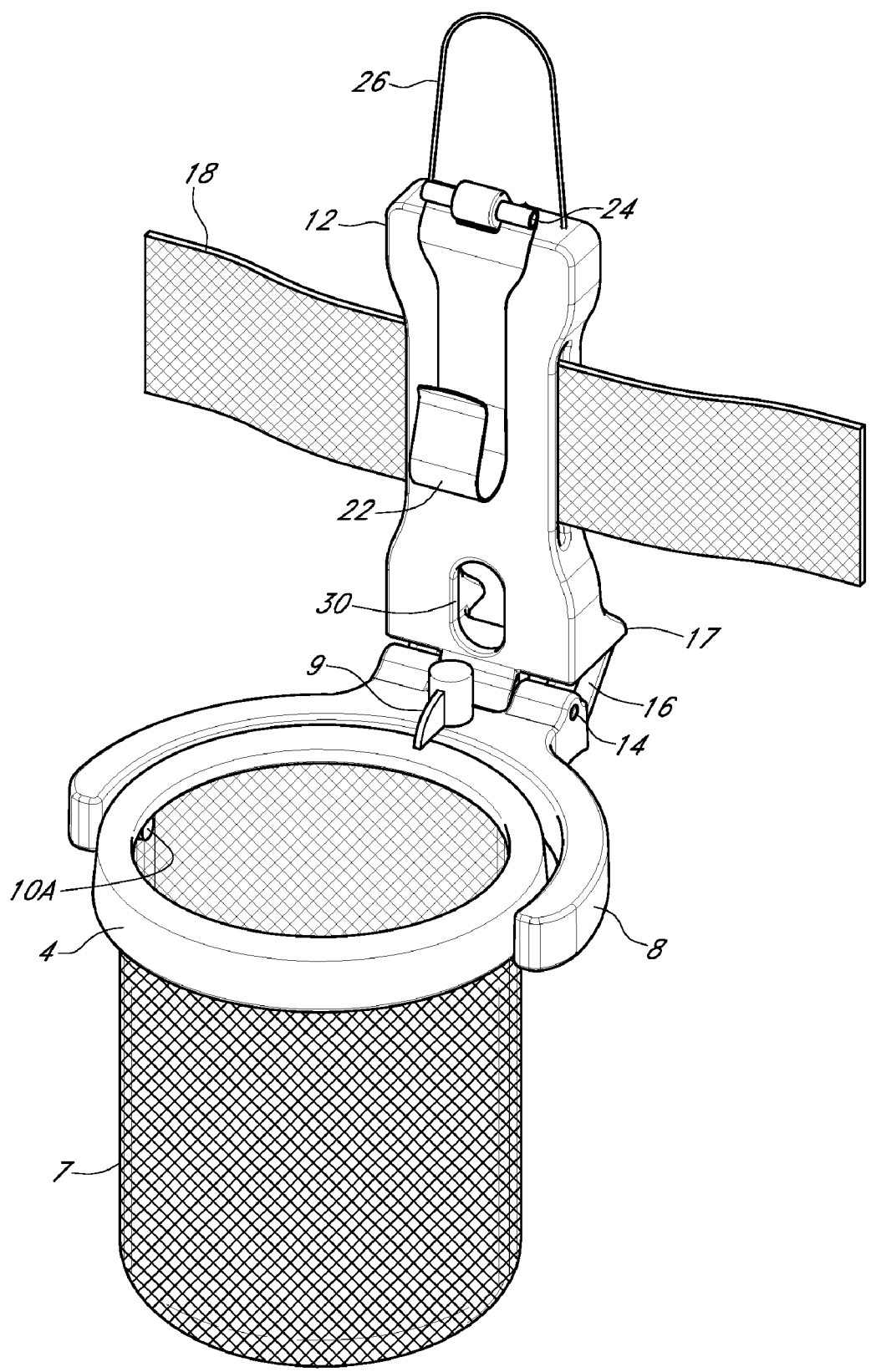
FIG. 10B is a perspective view of a portable holder for a beverage container with a second plate deployed 90 degrees from a first plate and a hook folded along a hinge attachment to the second plate.

FIG. 10B is a perspective view of a portable holder for beverage containers with the second plate 12 deployed about 90 degrees from the first plate 8. The hook 22 has been folded along the hinge that attaches the hook 22 to the second plate 12. In this position, the portable holder for a beverage container can be suspended from loop 26, which is configured to support the weight of the portable holder as well as a beverage container and corresponding beverage.

Figure 10C:
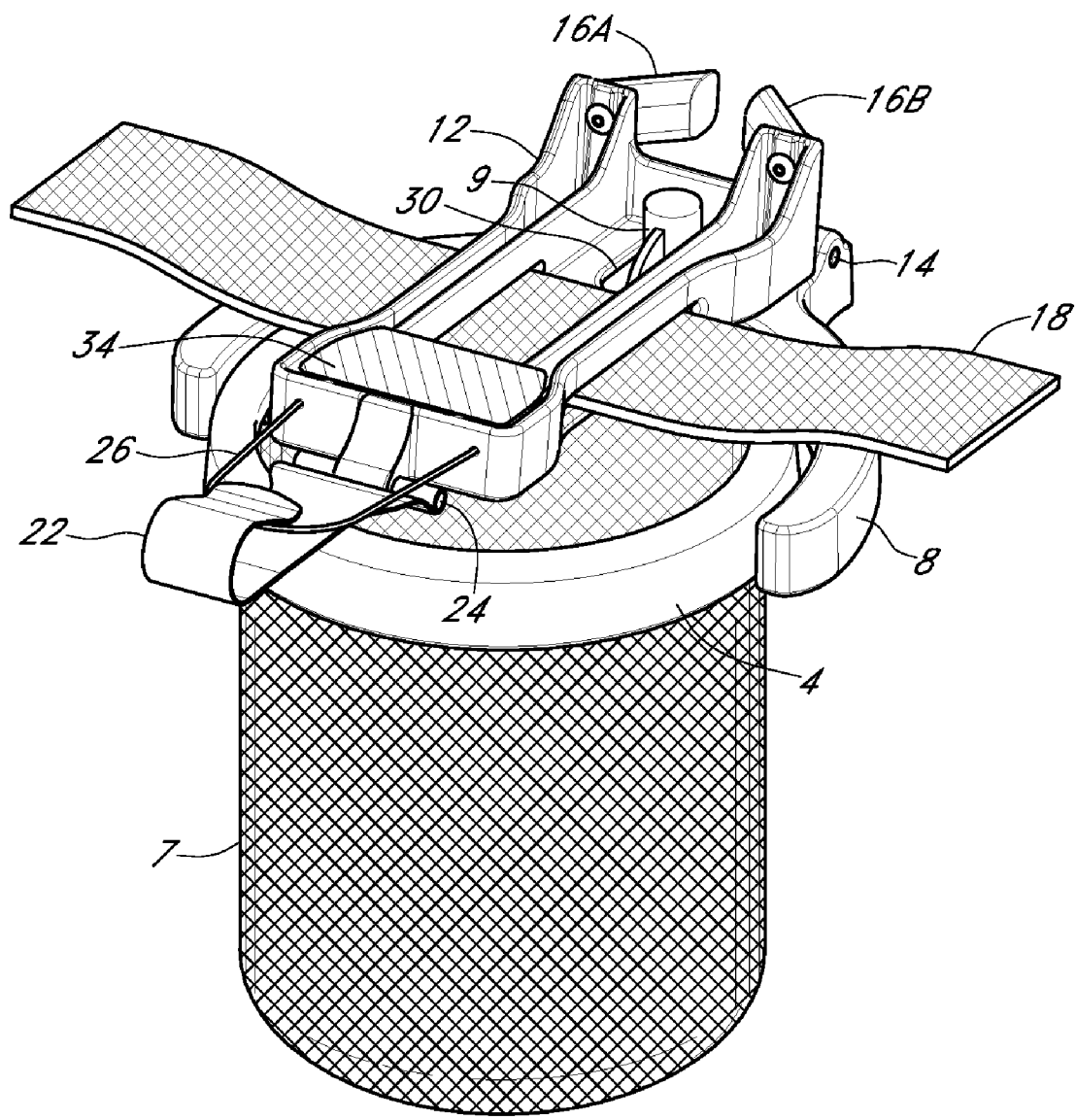
FIG. 10C is a perspective view of a portable holder for a beverage container with a second plate folded along a hinge connection to a first plate.

FIG. 10C is a perspective view of a portable holder for beverage containers with a second plate 12 folded down towards the first plate 8 along the hinge that connects that first plate 8 to the second plate. As mentioned above, the hole 30 in the second plate 12 allows the second plate 12 to be folded without interruption of the third moveable position piece. In the folded position the third movable position piece 9 protrudes through the hole 30 in the second plate 12. Thus, the portable holder for beverage container is collapsed for ease during travel. FIG. 10C additionally illustrates a resistance piece 34, attached to the second plate 12. In some embodiments the resistance piece 34 is attached to a portion of the portable holder for beverage containers to provide a non-skid function. For example, in one embodiment of a portable holder for beverage containers a loop 26 is deployed such that the portable holder for beverage containers may be suspended therefrom, as illustrated in FIG. 10B, a resistance piece 34 placed on the back of a second plate 12 would prevent the portable holder for beverage containers from sliding with respect to a vertical or semi-vertical surface. In another example, when an embodiment of the portable holder for beverage containers includes a second plate 12 deployed 90 degrees from a first plate 8 as in FIG. 10A, a resistance piece 34 placed on the back of the second plate 12 would serve to prevent the second plate 12 from sliding with respect to a horizontal or semi-horizontal surface.

Figure 10D:
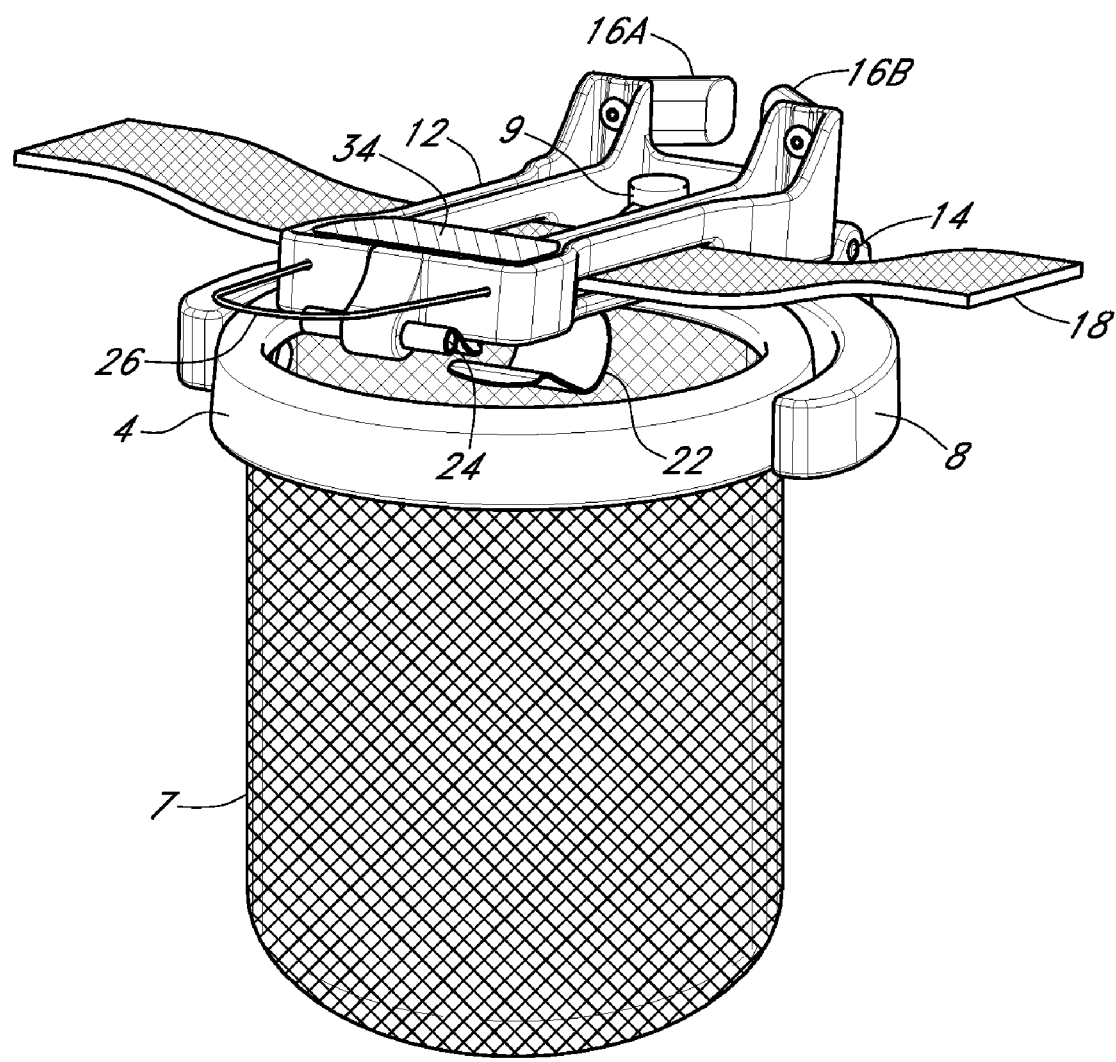
FIG. 10D is a perspective view of a portable holder for a beverage container with a hook folded under a second plate, which is folded along a hinge connection to a first plate.

FIG. 10D is a perspective view of a portable holder for a beverage container that further compresses the volume of the portable holder by folding the hook 22 folded under the second plate 12 and folding the second plate 12 about the hinge attachment to a first plate 8. In some embodiments the hook 22 is folded toward the second plate 12 prior to the second plate being folded toward the first plate. In other embodiments the second plate is folded to the first plate prior to the hook 22 folding toward the second plate. As in FIG. 10C, a resistance piece 34 is illustrated in FIG. 10D placed on the back of the second plate 12. In other embodiments the resistance piece 34 may be attached to other portions of the portable holder for beverage containers. For example, in some embodiments one or more resistance pieces may be attached to the first plate 8 or various portions of the second plate 12. With the benefit of the instant disclosure, one of ordinary skill in the art will appreciate that resistance pieces of various sizes may be added as single or multiple pieces to the portable holder for beverage containers to provide traction or non-slip support. With the benefit of the instant disclosure, one or ordinary skill in the art also will appreciate that a resistance piece may include any non-skid, adhesive, semi-adhesive, abrasive or friction-producing material. Further, as mentioned above, in some embodiments the mesh material 7 can be compressed to a smaller volume next to first plate 8. In some embodiments a portable holder for beverage containers may be folded to a collapsed position prior to storage.

Figure 11A:
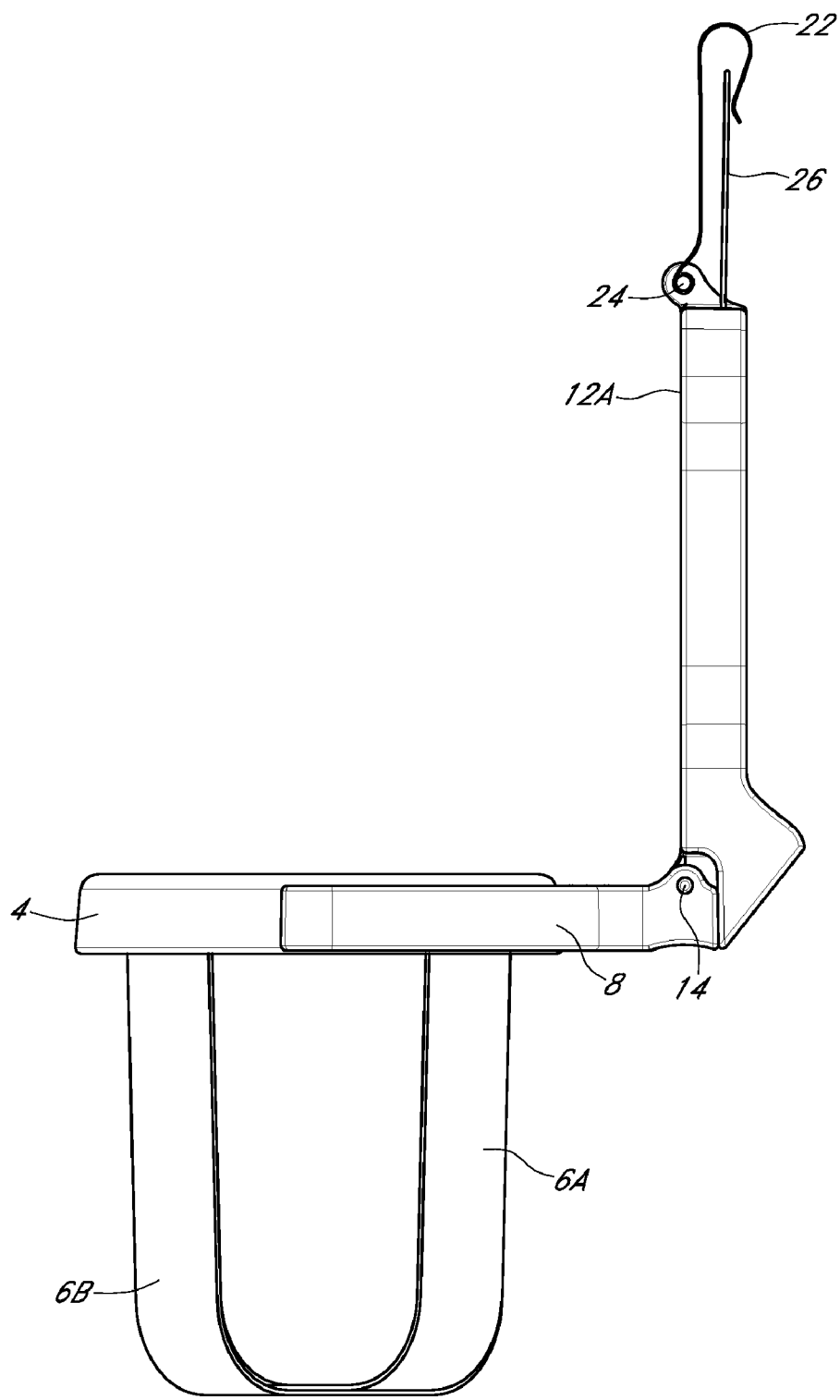
FIG. 11A is a side view of a portable holder for a beverage container.

FIG. 11A is a side view of a portable holder for a beverage container. The side view illustrates a hinge that includes a pin 24 attaching the hook 22 to a second plate 12A. The side view also illustrates a hinge comprising a rod 14 attaching the first plate 8 to the second plate 12A. In the embodiment of FIG. 11A the second plate 12A extends to brace the second plate 12A directly against the side of the first plate 8. Thus, in this embodiment the second plate 12A prevents the hinge between the first plate 8 and the second plate 12A from opening past about 90 degrees.

Figure 11B:
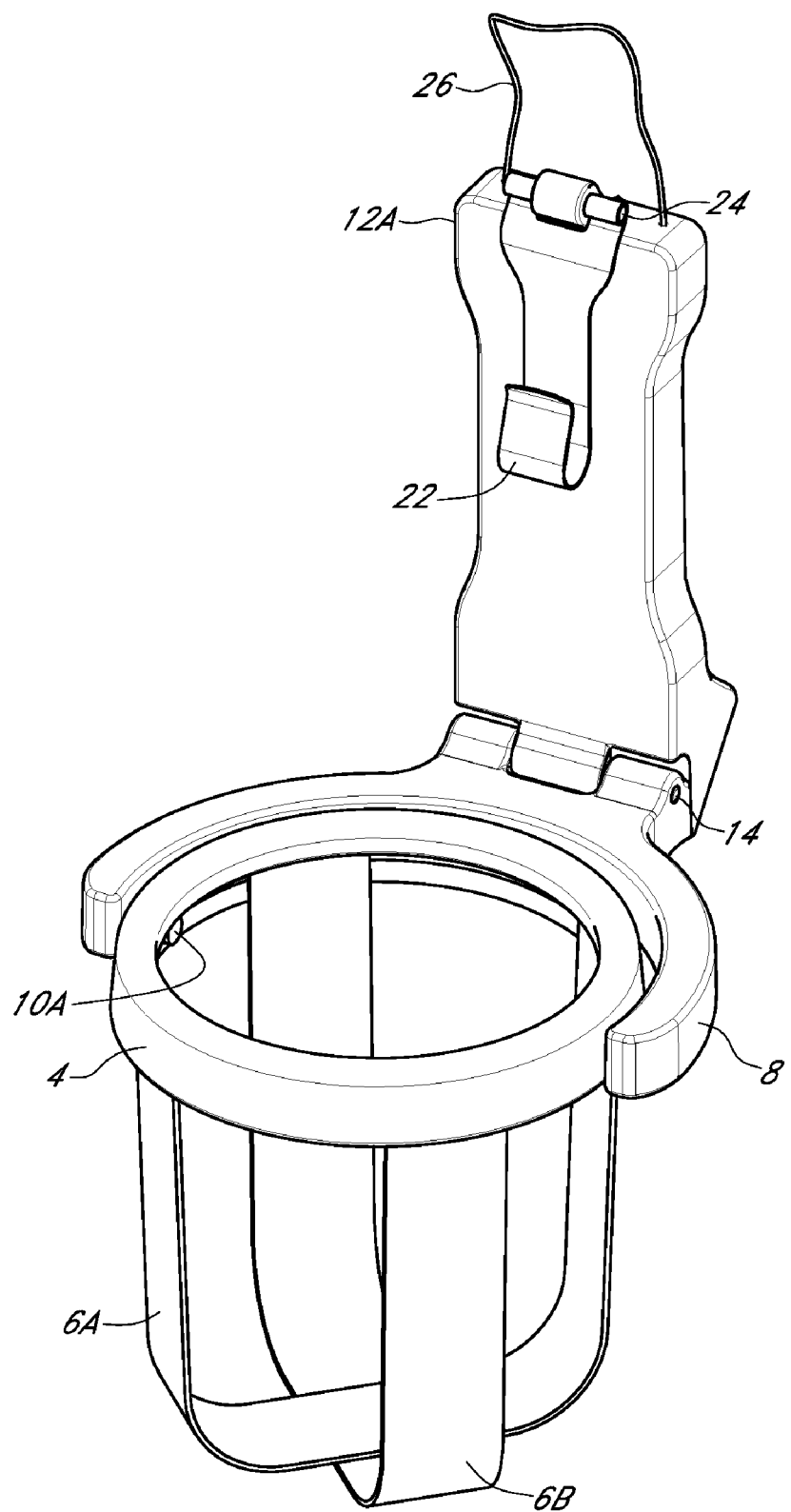
FIG. 11B is a perspective view of the portable holder for a beverage container of FIG. 11A.

FIG. 11B is a perspective view of the portable holder for a beverage container of FIG. 11A. The second plate 12A prevents the hinge between the first plate 8 and the second plate 12A from opening to greater than about 90 degrees. As illustrated in FIG. 11B the hook 22 is folded along the hinge connecting the hook 22 with the second plate 12A. In this position, the folded hook 22 is approximately parallel to the second plate 12A. The loop 26 connected to the second plate 12A is deployed for use. As noted above, the loop 26 is a hanging member configured hold the weight of the portable holder for beverage containers therefrom. The loop 26 may comprise any sort of suitable material configured to support at least the weight of a beverage container and usually support the weight of a full beverage placed in the holder for beverage containers.

In some embodiments the devices optionally may not include a "basket" 6. For example, the devices can exclude the straps or mesh baskets. Many beverage containers are designed with tapered designs, that is, with the bottom having a smaller diameter than the top of the container. As long as the diameter or circumference of the first movable position piece 4, for example, is smaller than the diameter or circumference of the beverage container, then the device will work to hold the beverage container regardless of whether the device include a basket. As such, the bottom portion of the beverage container can fit through and into the first movable position piece 4 or any other support component for the container, and the top portion of the beverage container will be stopped at the point where its outer diameter/circumference is the same as the inner diameter/circumference of piece 4, for example.

Figure 12:
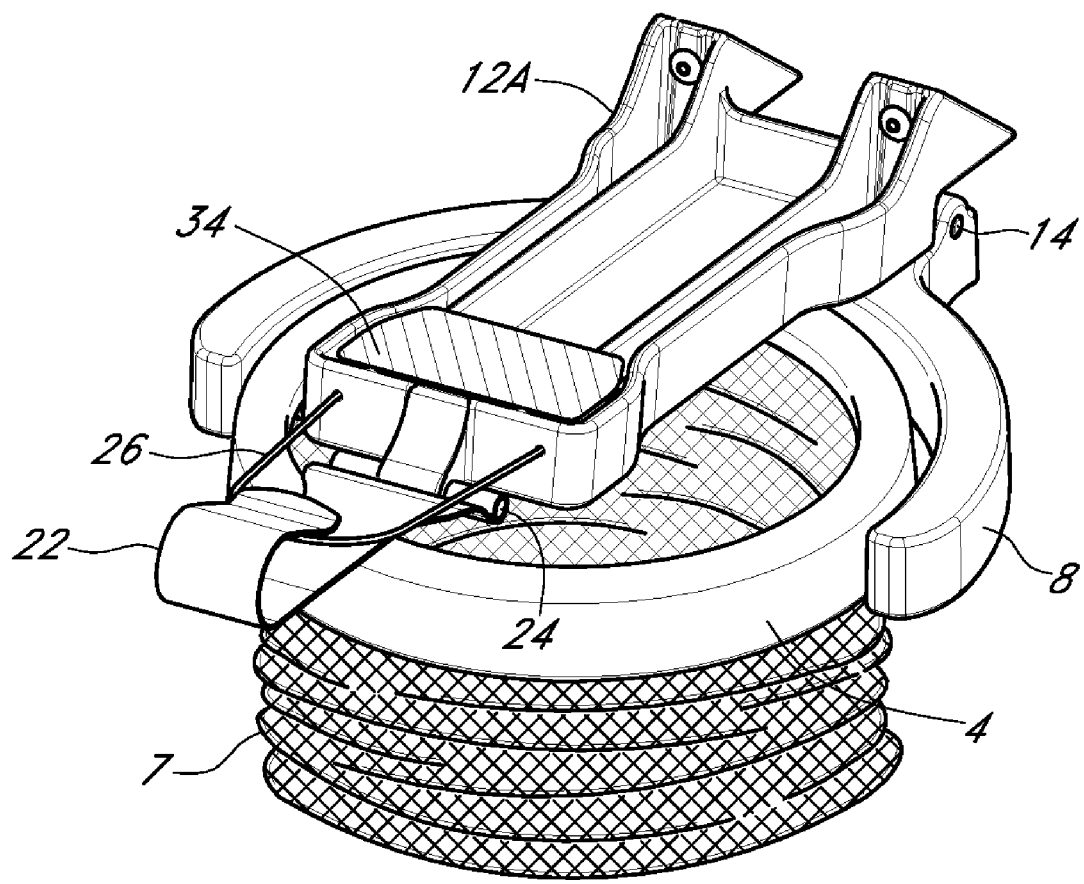
FIG. 12 is a perspective view of a portable holder for a beverage container with a second plate folded along a hinge with respect to a first plate.

FIG. 12 is a perspective view of another embodiment of a portable holder for a beverage container. As illustrated in FIG. 12, the second plate 12A is in a folded position. In an open position the second plate 12A can prevent the hinge 14 between the first plate 8 and the second plate 12A from opening to greater than about 90 degrees. In this position, basket 7 can be folded so the entire portable holder for a beverage container may be compressed to a small size or volume for storage. As in some of the above embodiments the holder for a beverage container may be configured to fold into a volume less than $1 \times 3 \times 3$ in$^3$. FIG. 12 also depicts an optional resistance piece 34, which help minimize movement of the device when in a hanging or suspended position.

In an open configuration, the portable holder for a beverage container may be hung by a hanging member, for example, the hook 22 or the loop 26. In an airport setting, the hook 22 may be used to hang the portable holder for a beverage container on a piece of luggage. For example, using the embodiment of FIG. 12 (or any of the above-described embodiments) a traveler or other user may hang a beverage container holder on a piece of luggage, the back of an airline tray table, in a car (for example, from a seat, seatback, door panel or any other suitable surface) or other vehicle, and place a beverage container in the beverage container holder. Some aspects relate to bags, briefcases and/or luggage that comprise an optionally removable holder for a beverage container as described herein.

It will be appreciated by those skilled in the art that various modifications and changes may be made without departing from the scope of the invention. Such modifications and changes are intended to fall within the scope of the embodiments, as defined by the appended claims. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A portable holder for a beverage container, comprising:
    a first plate attached to a first movable position piece, wherein the first movable position piece is configured to hold a beverage container placed therein, wherein the first movable position piece is configured to rotate with respect to the first plate, and wherein the first movable position piece comprises a basket attached to the first movable position piece;
    a second plate connected to the first plate by a hinge; and
    a third movable position piece attached to the first plate, wherein the third movable position piece is movable into a position that, prevents the first movable position piece from rotating past horizontal with respect to the first plate in a first direction.

2. The portable holder for a beverage container of claim 1, wherein the basket comprises a mesh.

3. The portable holder for a beverage container of claim 1, wherein the basket comprises a first strap.

4. The portable holder for a beverage container of claim 3 further comprising a second strap connected to the second plate.

5. The portable holder for a beverage container of claim 1, wherein the first movable position piece at least partially circumnavigates a beverage container placed therein.

6. The portable holder for a beverage container of claim 1, wherein the position of the first plate relative to the second plate prevents the hinge from opening to an angle greater than about 90 degrees.

7. The portable holder for a beverage container of claim 1, wherein the first movable position piece is attached to the first plate at two places.

8. The portable holder for a beverage container of claim 1 further comprising a hanging member attached to the second plate, wherein the hanging member is configured to support the weight of the portable holder for a beverage container suspended therefrom, and wherein the hanging member is selected from the group consisting of a hook and a loop.

9. The portable holder for a beverage container of claim 1, wherein the second plate further comprises a hole at least partially penetrating the second plate such that when the hinge connecting the first plate and the second plate is substantially closed, the third movable position piece at least partially penetrates the hole.

10. The portable holder for a beverage container of claim 1, wherein the third movable position piece is rotatably attached to the first plate.

11. The portable holder for a beverage container of claim 1 further comprising a second movable position piece.

12. The portable holder for a beverage container of claim 11, wherein the second movable position piece is permanently attached to the second plate such that no rotation of the second movable position piece with respect to the second plate is possible.

13. The portable holder for a beverage container of claim 11, wherein the second movable position piece is configured to allow the hinge to open to a first position and a second position.

14. The portable holder for a beverage container of claim 13, wherein the first position is approximately 90 degrees and wherein the second position is approximately 180 degrees.

15. The portable holder for a beverage container of claim 8, wherein the hanging member is a hook and wherein the hook is attached to the second plate by a hinge, such that the hook and the second plate are configured to form at least one of a first angle of approximately 180 degrees and a second angle of approximately 0 degrees.

16. The portable holder for a beverage container of claim 15, wherein when the hook and the second plate form the second angle and the hinge connecting the first plate and the second plate is substantially closed, the hook at least partially penetrates the basket.

17. A portable holder for a beverage container, comprising:
    a basket configured to hold a beverage container;
    a first plate attached to the basket, wherein the basket is configured to rotate with respect to the first plate;
    a second plate attached to the first plate by a hinge, wherein the hinge is configured to move from a first position to a second position, and wherein when the hinge is in the first position an angle between the first plate and the second plate is approximately 90 degrees; and
    a hanging member attached to the second plate, wherein the hanging member comprises a hook and a loop, wherein the loop contacts the second plate in two places such that the loop is positioned in the same plane as the second plate, and wherein at least one of the hook and the loop is configured to support the weight of the portable holder for a beverage container and a beverage container suspended therefrom.

18. The portable holder for a beverage container of claim 17, wherein the basket comprises a mesh.

19. The portable holder for a beverage container of claim 17 further comprising a movable position piece rotatably attached to the first plate, wherein the movable position piece is configured to rotate into a position that prevents the basket from rotating with respect to the first plate in at least one direction.

20. The portable holder for a beverage container of claim 19, wherein the second plate further comprises a hole at least partially penetrating the second plate such that when the hinge connecting the first plate and the second plate is substantially closed, the movable position piece at least partially penetrates the hole.

* * * * *